United States Patent
Shimada et al.

(10) Patent No.: US 7,371,292 B2
(45) Date of Patent: May 13, 2008

(54) ND-FE-B TYPE ANISOTROPIC EXCHANGE SPRING MAGNET AND METHOD OF PRODUCING THE SAME

(75) Inventors: Munekatsu Shimada, Tokyo (JP); Hideaki Ono, deceased, late of Yokohama (JP); by Takae Ono, legal representative, Yokohama (JP); Makoto Kano, Yokohama (JP); Tetsurou Tayu, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 462 days.

(21) Appl. No.: 10/705,235

(22) Filed: Nov. 12, 2003

(65) Prior Publication Data

US 2004/0144449 A1 Jul. 29, 2004

(30) Foreign Application Priority Data

Nov. 12, 2002 (JP) ............................. 2002-328579

(51) Int. Cl.
*H01F 1/057* (2006.01)
(52) U.S. Cl. ....................... 148/302; 148/101; 148/103
(58) Field of Classification Search ...................... None
See application file for complete search history.

(56) References Cited

U.S. PATENT DOCUMENTS

| | | | | |
|---|---|---|---|---|
| 6,235,129 B1* | 5/2001 | Kojima et al. | ............... | 148/302 |
| 6,558,482 B1* | 5/2003 | Arai et al. | ................... | 148/302 |
| 6,896,745 B2* | 5/2005 | Arai et al. | ................... | 148/302 |
| 2002/0036032 A1* | 3/2002 | Arai et al. | ................... | 148/302 |
| 2002/0153064 A1* | 10/2002 | Arai et al. | ................... | 148/301 |
| 2003/0136468 A1* | 7/2003 | Kanekiyo et al. | ........... | 148/101 |
| 2003/0183305 A1* | 10/2003 | Murakami et al. | .......... | 148/302 |
| 2003/0213534 A1* | 11/2003 | Arai et al. | ................... | 148/302 |
| 2004/0025974 A1* | 2/2004 | Lee et al. | .................... | 148/301 |
| 2004/0134567 A1* | 7/2004 | Kanekiyo et al. | ........... | 148/302 |

FOREIGN PATENT DOCUMENTS

JP 7-173501 7/1995
JP 7-176417 7/1995

(Continued)

OTHER PUBLICATIONS

M. Sagawa et al., "Nd-Fe-B Permanent Magnet Materials", Japanese Journal of Applied Physics, vol. 26, No. 6, Jun. 1987, pp. 785-800.

(Continued)

*Primary Examiner*—John P. Sheehan
(74) *Attorney, Agent, or Firm*—McDermott Will & Emery LLP

(57) ABSTRACT

A Nd—Fe—B type anisotropic exchange spring magnet is produced by a method of obtaining powder of a Nd—Fe—B type rare earth magnet alloy which comprises hard magnetic phases and soft magnetic phases wherein a minimum width of the soft magnetic phases is smaller than or equal to 1 μm and a minimum distance between the soft magnetic phases is greater than or equal to 0.1 μm, obtaining a compressed powder body by compressing the powder, and obtaining the Nd—Fe—B type anisotropic exchange spring magnet by sintering the compressed powder body using a discharge plasma sintering unit.

10 Claims, 14 Drawing Sheets

FOREIGN PATENT DOCUMENTS

| | | |
|---|---|---|
| JP | 11-8109 | 1/1999 |
| JP | 11-97222 | 4/1999 |
| JP | 2000-235909 | 8/2000 |

OTHER PUBLICATIONS

R. W. Lee, "Hot-pressed neodymium-iron-boron magnets", Applied Physics Letter, 46, (8), Apr. 15, 1985, pp. 790-791.

T. Takeshita et al., "Magnetic Properties and Microstructures of the NdFeB Magnet Powder Produced by Hydrogen Treatment", Proc. 10th Int. Workshop on Rare-Earth Magnets and Their Applications, Kyoto, (1989) pp. 551-557.

E. F. Kneller et al., "The Exchange-Spring Magnet: A New Material Principle for Permanent Magnets", IEEE Transactions on Magnets, vol. 27, No. 4, Jul. 1991, pp. 3588-3600.

R. Skomski et al., "Giant energy product in nanostructured two-phase magnets", Physical Review B, vol. 48, No. 21, Dec. 1, 1993, 15812-15816.

R. Coehoorn et al., "Ovel Permanent Magnetic Materials Made by Rapid Quenching", Journal de Physique, 49 (1988), C8-669.

L. Withanawasam et al., "Nanocomposite $R_2Fe_{14}B/Fe$ exchange coupled magnets", J. Appl. Phys. 76(10), Nov. 15, 1994, pp. 7065-7067.

\* cited by examiner

ND-FE-B TYPE ANISOTROPIC EXCHANGE SPRING MAGNET AND METHOD OF PRODUCING THE SAME

BACKGROUND OF THE INVENTION

The present invention relates to a rare earth permanent magnet having anisotropy and a method of producing the magnet.

Nd—Fe—B type permanent magnets have been widely used as a magnet for a motor. Such magnets have been produced by means of a melting method disclosed in M. Sagawa et al., Japanese Journal of Applied Physics 26 (1987) 785 or a quenching method disclosed in R. W. Lee, Applied Physics Letter 46 (1985) 790. Further, it is possible to produce magnet powder having anisotropy by means of a HDDR treatment disclosed in T. Takeshita et al., Proc. 10th Int. Workshop on Rare Earth Magnets and Their Applications, Kyoto, (1989) 511.

The magnetic properties of Nb—Fe—B type permanent magnets have approached a theoretical limit, and therefore it is desired to develop next-generation high-performance magnets. One of the next-generation magnets is an exchange spring magnet, which is also called nano-composite magnet, as disclosed in E. F. Kneller and R. Hawig, IEEE Transaction Magnetics 27 (1991) 3588. Such an exchange spring magnet has a structure where hard magnetic phases and soft magnetic phases are finely dispersed at intervals of several tens nm. The exchange spring magnet performs like as a unit hard magnetic phase as a whole since the magnetization of the soft magnetic phases is not easily reversed for the reason that the magnetizations of the hard and soft magnetic phases are coupled by the exchange interaction therebetween. Accordingly, it has been evaluated that the nano-composite magnet has a possibility for functioning as a very high-performance magnet. For example, it has been reported in R. Skomski and J. M. D. Coey, Physical Review B48 (1993) 15812 such that if $Sm_2Fe_{17}N_3$/Fe type alloy can have a property of anisotropy, $(BH)max=137$ MGOe will be theoretically obtained. A producing method of $Nd_2Fe_{14}B/Fe_3B$ type exchange spring magnet has been proposed in R. Coehoorn et al., Journal de Physique 49 (1988) C8-669. Further, a producing method of $Nd_2Fe_{14}B$/Fe type exchange spring magnet has been proposed in Japanese Patent Provisional Publication Nos. 7-173501 and 7-176417 and in L. Withanawasam et al., Journal of Applied Physics 76 (1994) 7065.

However, a melt spun method or mechanical alloying (MA) method employed in the above magnet producing methods cannot produce the magnet having the magnetic anisotropy, and therefore the property of the obtained exchange spring magnet is not sufficient as compared to the theoretical property.

Furthermore, various producing methods of an anisotropic exchange spring magnet have been proposed. For example, Japanese Patent Provisional Publication No. 11-8109 has disclosed a producing method of crystallizing Nd—Fe—B amorphous alloy by heating in a high magnetic field. Japanese Patent Provisional Publication No. 11-97222 has disclosed a producing method of hot working a quenched thin strip alloy so that hard and soft magnetic phases are finely and dispersedly precipitated. Japanese Patent Provisional Publication No. 2000-235909 has disclosed a method of directly producing a magnet having the anisotropy by executing a warm-working uniaxial-deformation under a liquid phase existing condition of the raw material.

SUMMARY OF THE INVENTION

However, it is further required to improve the magnetic property of an anisotropic exchange spring magnet and to develop a method of easily producing such an improved anisotropic exchange spring magnet.

It is therefore an object of the present invention to provide a Nd—Fe—B type anisotropic exchange spring magnet having a superior magnetic property and to provide a method of producing the Nd—Fe—B type anisotropic exchange spring magnet.

It is another object of the present invention to provide a magnet alloy and powder thereof which are used in producing the exchange spring magnet.

It is a further object of the present invention to provide a motor which comprises the Nd—Fe—B type anisotropic exchange spring magnet.

An aspect of the present invention resides in a Nd—Fe—B type rare earth magnet alloy which comprises hard magnetic phases and soft magnetic phases, wherein a minimum width of the soft magnetic phases is smaller than or equal to 1 μm and a minimum distance between the soft magnetic phases is greater than or equal to 0.1 μm.

Another aspect of the present invention resides in powder of a Nd—Fe—B type rare earth magnet alloy which comprises hard magnetic phases and soft magnetic phases, wherein a minimum width of the soft magnetic phases is smaller than or equal to 1 μm and a minimum distance between the soft magnetic phases is greater than or equal to 0.1 μm.

A further aspect of the present invention resides in a method of producing powder of a Nd—Fe—B type rare earth magnet alloy which comprises hard magnetic phases and soft magnetic phases wherein a minimum width of the soft magnetic phases is smaller than or equal to 1 μm and a minimum distance between the soft magnetic phases is greater than or equal to 0.1 μm. The method comprises pulverizing the Nd—Fe—B type rare earth magnet alloy by means of a ball mill using a dispersant under a non-oxidation atmosphere.

A further aspect of the present invention resides in a method of producing a Nd—Fe—B type anisotropic exchange spring magnet, which method comprises obtaining powder of a Nd—Fe—B type rare earth magnet alloy which comprises hard magnetic phases and soft magnetic phases wherein a minimum width of the soft magnetic phases is smaller than or equal to 1 μm and a minimum distance between the soft magnetic phases is greater than or equal to 0.1 μm, obtaining a compressed powder body by compressing the powder at a compressing pressure ranging from 1 to 5 ton/cm$^2$ in a magnetic field ranging from 15 to 25 kOe, and obtaining a bulk magnet by sintering the compressed powder body at a temperature ranging from 600 to 800° C. and at a compressing pressure ranging from 1 to 10 ton/cm$^2$ in a discharge plasma sintering unit.

A further aspect of the present invention resides in a Nd—Fe—B type anisotropy exchange spring magnet produced by a method of obtaining powder of a Nd—Fe—B type rare earth magnet alloy which comprises hard magnetic phases and soft magnetic phases wherein a minimum width of the soft magnetic phases is smaller than or equal to 1 μm and a minimum distance between the soft magnetic phases is greater than or equal to 0.1 μm; obtaining a compressed powder body by compressing the powder at a compressing pressure of 1 through 5 ton/cm$^2$ in a magnetic field ranging from 15 to 25 kOe; and obtaining a bulk magnet by sintering the compressed powder body at a temperature ranging from 600 to 800° C. and at a compressing pressure ranging from 1 to 10 ton/cm² in a discharge plasma sintering unit.

A further aspect of the present invention resides in a motor which comprises a magnet produced by a method of obtaining powder of a Nd—Fe—B type rare earth magnet alloy which comprises hard magnetic phases and soft magnetic phases wherein a minimum width of the soft magnetic phases is smaller than or equal to 1 μm and a minimum distance between the soft magnetic phases is greater than or equal to 0.1 μm, obtaining a compressed powder body by compressing the powder at a compressing pressure of 1 to 5 ton/cm² in a magnetic field ranging from 15 to 25 kOe, and obtaining a bulk magnet by sintering the compressed powder body at a temperature ranging from 600 to 800° C. and at a pressure ranging from 1 to 10 ton/cm² in a discharge plasma sintering unit.

The other objects and features of this invention will become understood from the following description with reference to the accompanying drawings.

DETAILED DESCRIPTION OF THE INVENTION

Inventors of the present invention found that it was possible to obtain a Nd—Fe—B type anisotropic exchange spring magnet having a superior magnetic property by using a rare earth magnet alloy containing soft magnetic phases and hard magnetic phases in a predetermined condition, as starting material. Further, the inventors found that it was preferable to employ a ball-mill to pulverize the starting material in producing the Nd—Fe—B type anisotropic exchange spring magnet and further found a preferable production condition for producing the Nd—Fe—B type anisotropic exchange spring magnet.

Figure 1:
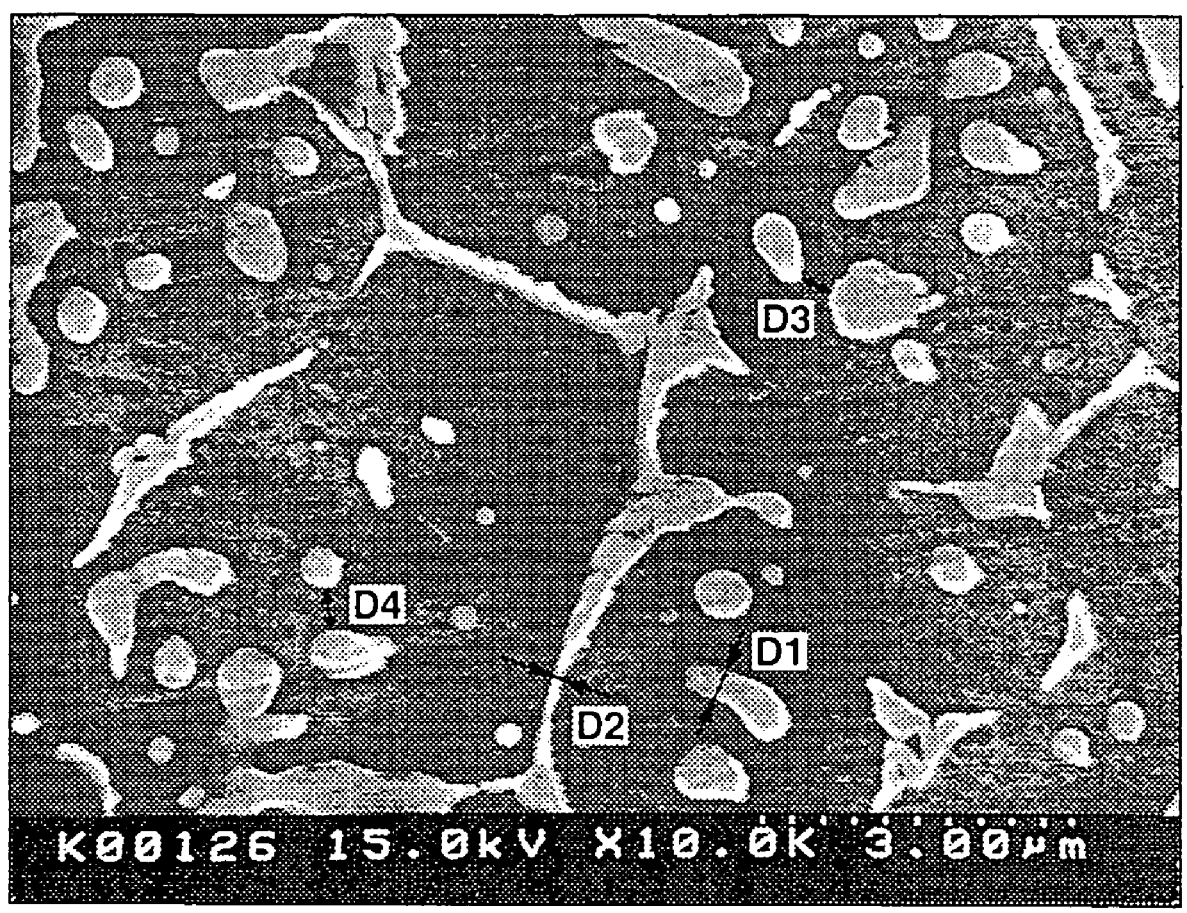
FIG. 1 is a scanning electron microscope (SEM) photograph showing a cross section of a rare earth magnet alloy (having a composition of $Nd_{9.1}Fe_{75.8}Co_8B_{6.1}V_1$) of EXAMPLE I according to the present invention.

First, a producing method of the anisotropic exchange spring magnet is briefly discussed. By means of a strip casting method, the rare earth magnet alloy according to the present invention is obtained. FIG. 1 is a SEM photograph showing a cross-section of the rare earth magnet alloy, whose composition is $Ni_{9.1}Fe_{75.8}Co_8B_{6.1}V_1$, according to the present invention. In FIG. 1, whitish bubble-shaped parts and whitish needle-shaped parts are soft magnetic phases. Throughout the description of the present invention, "soft magnetic phase" is a part recognized in the photograph having the scale factor as same as that in FIG. 1. More specifically, the soft magnetic phase having a size smaller than 0.1 μm in FIG. 1 is excluded from "soft magnetic phase" defined in the present invention. Further, other darkish part except for "soft magnetic phase" is "hard magnetic phase". The "hard magnetic phase" is a hard magnetic phase region like as a mono-crystal. In pulverizing process of the magnet alloy, a size of power becomes smaller than a size of the hard magnetic phase region of the magnet alloy. More specifically, in the pulverizing process, a crystalline grain size of the hard magnetic phases becomes fine by the repetition of cross-slip of crystals. Further, cross-slip of the crystals including the soft magnetic phases is also repeated in the pulverizing process. Therefore, the powder obtained by the pulverizing process includes the soft magnetic phases of fine size in addition to the hard magnetic phases of fine size.

Even after the magnet alloy is pulverized into a size smaller than a size of the hard magnetic phase region, each fine-size hard magnetic phase in the obtained power maintains the crystal orientation as same as that of the original hard magnetic phase. The hard magnetic phases of the obtained powder contain strains generated during pulverizing process using a ball mill. By executing the heat treatment subsequently to the pulverizing process, the hard magnetic phases of the obtained powder change into the fine hard magnetic phases which have recovered the magnetic property and in which the axes of the easy magnetization are aligned. As discussed above, the powder obtained by pulverizing the alloy using a ball mill also includes fine soft magnetic phases in addition to the hard magnetic phases. Accordingly, the heat treatment of the power provides a further superior anisotropic rare earth magnet powder (anisotropic exchange spring magnet powder) in which the soft magnetic phases and the hard magnetic phases whose axes of easy magnetization are aligned are mixed.

Subsequently, there will be discussed methods of conveniently checking that the rare earth magnet alloy comprises the soft magnetic phases in addition to hard magnetic phases and that the hard magnetic phase region is formed into like a mono-crystal, that is, methods of conveniently checking the alignment of the crystal orientation. One of the methods is a method of checking the magnetic property of the exchange spring magnet which was practically produced. First, a magnet to be checked is obtained by pulverizing the magnet alloy using a ball mill, by producing a compressed powder body by means of a compressing process in a magnetic field, and by sintering the compressed powder body under the temperature lower than 800° C. using an electro-discharge plasma apparatus so as to produce a bulk magnet. Subsequently, the degree of the anisotropy of the bulk magnet is checked by comparing a magnetization curve along the direction parallel to the magnetic field direction applied during the compressing process and a magnetization curve along the direction perpendicular to the magnetic field direction during the compressing process. When the anisotropy of the bulk magnet is confirmed, it is determined that the hard magnetic phase regions are put in an estimated condition.

Another method is a simple method. First, a sample for a vibrating sample magnetometer (VSM) is produced by pulverizing thin strips of a rare earth magnet alloy, by mixing the obtained powder with epoxy resin functioning as adhesive and by hardening the mixture poured in a VSM sample container while being put in a magnetic field. Subsequently, there are measured a magnetization curve of a parallel-set sample which is set in the VSM so that the magnetic field applied to the sample by the VSM is parallel to the direction of the magnetic field applied during the sample producing process and the magnetization curve of the perpendicular-set sample which is set in the VSM so that the magnetic field applied to the sample by the VSM is perpendicular to the direction of the magnetic field applied during the sample producing process. Finally, the degree of mono-crystal like of the hard magnetic phase region, which degree is indicative of the anisotropy of the produced sample, is estimated from the ratio (Js ratio) between the magnetizations (Js) of the parallel-set sample and the perpendicular-set sample at the measured maximum magnetic field of 16 kOe. It is preferable that the thin strip of the rare earth magnet alloy is further finely pulverized. However, in this embodiment, the size of the obtained powder has been determined to be smaller than or equal to 25 μm for the reasons that this size of 25 μm is a limit which is capable of being manually produced by pulverizing the material using a mortar and pestle and classifying the obtained powder using sieves. It is assumed that the crystal orientations of adjacent hard magnetic phase regions are almost aligned, that is, they are textured.

The latter method is an effective means for the development of the rare earth magnet alloys. As a result of actually producing exchange spring magnets, when a rare earth magnet alloy having a Js ratio greater than 1.3 was employed as starting material, it became possible to produce an anisotropic exchange spring magnet therefrom. As discussed above, the Js ratio is a ratio between the magnetizations (Js) of the parallel-set sample and the perpendicular-set sample at the measured maximum magnetic field. Further, the Js ratio of a bulk magnet produced from the same alloy was greater than the Js ratio of the VSM sample produced by this method.

By compressing the rare earth magnet powder in a condition of a predetermined magnetic field and a predetermined pressure, a compressed powder body (green compact) having the anisotropic property is obtained. Further, by sintering the green compact under a relative low temperature so as not to grow crystals thereof, a Nd—Fe—B type anisotropic exchange spring magnet having a superior magnetic property is obtained. With the thus method, the aimed magnet is easily obtained.

The inventors of the present invention found that a superior anisotropic exchange spring magnet was obtained when Nd—Fe—B type rare earth magnet alloy employed as starting material has a structure wherein hard magnetic phases and soft magnetic phases are mixed so as to satisfy a predetermined condition, as a result of due consideration taking account of the properties and the productivity of various anisotropic exchange spring magnets. That is, the inventors reached a first aspect of the present invention that a Nd—Fe—B type rare earth magnet alloy having a mixed structure of the hard magnetic phases and soft magnetic phases is characterized such that the minimum width of the soft magnetic phase is substantially smaller than or equal to 1 μand the minimum distance between the soft magnetic phases is substantially greater than or equal to 0.1 μm.

Herein, there are explained the minimum width of soft magnetic phase and the minimum distance between soft magnetic phases, with reference to FIG. 1. As already defined, "soft magnetic phase" is a soft magnetic phase which is recognized in the photograph having the scale factor in FIG. 1, and particularly has a size greater than or equal to 0.1 μm. "Minimum width of soft magnetic phase" in the present invention is a minimum value of a width of a soft magnetic phase detected when the rare earth magnet alloy is observed. As to a bubble-shaped soft magnetic phase, a length denoted by D1 in FIG. 1 corresponds to the minimum width in this soft magnetic phase. As to a needle-shaped soft magnetic phase, a width D2 at a portion except for end portions corresponds to the minimum width in this soft magnetic phase. On the other hand, "minimum distance between soft magnetic phases" is a distance between the bubble-shaped soft magnetic phase and the soft magnetic phase which is most adjacent to this bubble-shaped soft magnetic phase. The distances denoted by D3 and D4 in FIG. 1 correspond to the minimum distance between soft magnetic phases. As to the needle-shaped soft magnetic phase, the minimum distance is also a distance between the needle-shaped soft magnetic phase and the soft magnetic phase which is most adjacent to this needle-shaped soft magnetic phase.

Throughout the explanation of the present invention, a sentence "the minimum width is substantially smaller than or equal to 1 μm" means that more than 90% of the minimum widths of the respective soft magnetic phases are smaller than or equal to 1 μm when the soft magnetic phases are selected at random in a SEM photograph. For example, when 10 soft magnetic phases are selected at random, the number of the soft magnetic phases having the minimum width smaller than 1 μm may be 9 or 10. It is preferable that all of the soft magnetic phases have the minimum width smaller than 1 μm. Similarly, a sentence "minimum distance is substantially greater than or equal to 0.1 μm" means that more than 90% of the minimum distances of the respective soft magnetic phases are greater than or equal to 0.1 μm when the soft magnetic phases are selected at random in a SEM photograph. For example, when 10 soft magnetic phases are selected at random, the number of the soft magnetic phases having the minimum distance greater than or equal to 0.1 μm may be 9 or 10. It is preferable that all of the soft magnetic phases have the minimum distance greater than or equal to 0.1 μm. The minimum width and the minimum distance of the soft magnetic phases may be calculated by a method of observing a cross section of the magnet alloy by means of SEM (scanning electron microscope). The calculation procedure is not limited to this method and may be executed by other method. Although the recognition of the hard magnetic phases can be executed using TEM (transmission electron microscopy), it may be executed by means of a deductive reasoning as discussed above, as far as no problem occurs.

When the minimum width of the soft magnetic phase and the minimum distance between the soft magnetic phases satisfy the above-discussed values, the anisotropic exchange spring magnet has the superior properties. The reason thereof is that if the minimum distance between the soft magnetic phases is too small, that is, if the distance between the soft magnetic phases is too short, the hard magnetic phase region becomes too small. Therefore, it will become difficult to obtain the magnet powder wherein the hard magnetic phases are fine, the axes of easy magnetization of the hard magnetic phases are aligned, and the size of the magnet powder is greater than 0.1 µm. Further, if the minimum width of the soft magnetic phase is too large, that is, if the soft magnetic phase is too large, it will cause the problem that the pulverizing of the starting material would increase a difficulty.

The preferable compositions of the magnet material for obtaining the exchange spring magnet can be represented by the following chemical formula (1).

$$Nd_xFe_{100-x-y-z}B_yV_z \qquad (1)$$

It was estimated from X-ray diffraction analysis and measurement of the temperature dependency as to the magnetization such that in these compositions the hard magnetic phase was $Nd_2Fe_{14}B$, and the soft magnetic phase was $\alpha$-Fe.

The compositions of Nd—Fe—Co—B type rare-earth magnet alloy are, for example, $Nd_xFe_{85-x}Co_8B_6V_1$ wherein x is within a range from 9 to 11. That is, by using the rare-earth magnet ally having these compositions, an anisotropic exchange spring magnet having a superior magnetic property is obtained. It was estimated that the hard magnetic phase of the magnet having these compositions was $Nd_2(Fe—Co)_{14}B$, and the soft magnetic phase was $\alpha$-(Fe—Co), from the X-ray diffraction analysis and the measurement of the temperature dependency as to the magnetization of the produced magnet. However, the composition is not limited to these compositions, and it is preferable that x, y and z in the chemical formula (1) are respectively within the ranges discussed hereinafter. Further, the elements of the composition of Nd—Fe—Co—B rare-earth magnet alloy may be replaced with the elements discussed later by a predetermined quantity.

It is preferable that x in the chemical formula (1) ranges from 9 to 11. If the quantity of Nd becomes greater than 11 atom %, the ratio of the soft magnetic phase becomes smaller than 5%. This lowers the properties of the exchange spring magnet. On the other hand, if the quantity of Nd becomes smaller than 9 atom %, the difficulty of producing the rare-earth magnet alloy increases.

It is preferable that y in the chemical formula (1) ranges from 5 to 8. If the quantity of B becomes greater than 8 atom %, there is a possibility that other phase except for the phase of $Nd_2Fe_{14}B$ and the phase of $\alpha$-Fe is produced. On the other hand, if the quantity of B becomes smaller than 5 atom %, the difficulty of producing the rare-earth magnet alloy increases.

It is preferable that z in the chemical formula (1) ranges from 0 to 2. V is added in the rare-earth magnet to improve the fineness of crystals and the increase of coercivity. This addition is not essential and may be cancelled. However, if this addition is excessive, there is increased a possibility of lowering the magnetic property.

Nd may be replaced with Pr within a range from 0.01 to 80 atom %. It is preferable that Nd is replaced with Pr within a range from 20 to 60 atom %. When the quantity of the replacement with Pr is within a range from 20 to 60 atom %, the residual flux density is almost maintained, and the coercive force and the rectangular characteristic in the magnetization curve are improved.

Nd may be replaced with Dy or Tb within a range from 0.01 to 10 atom %. When the quantity of this replacement with Dy or Tb is within a range from 0.01 to 10 atom %, it is possible to improve the coercive force and the thermal property without largely lowering the residual flux density.

A part of Fe may be replaced with Co. When the part of Fe is replaced with Co, it is preferable that the replacement percentage is within a range from 0.01 to 30 atom %. This replacement within this range improves the thermal properties without degrading the coercive force and the residual flux density. In particular, when the quantity of the replacement with Co is within 5 to 20 atom %, it is possible to improve the residual flux density in addition to the thermal properties. It was estimated that when Fe was replaced with Co, the hard magnetic phase was $Nd_2(Fe—Co)_{14}B$, and the soft magnetic phase was $\alpha$-(Fe—Co), from a result of the X-ray diffraction analysis and the measurement of the temperature dependency of the magnetization.

Fe or Co in Fe—Co may be replaced with a small quantity of at least one of Al, Mo, Zr, Ti, Sn, Cu, Ga and Nb. This replacement promotes a microstructure of the magnet alloy and increases the coercive force. However, when the quantity of this replacement becomes excessive, the magnetic property may be rather degraded. From this viewpoint, it is preferable that the quantity of element to be replaced is within a range from 0.1 to 3 atom % with respect to the all composition.

It is impossible to completely eliminate a minute quantity of impurities since the magnet according to the present invention is alloy material. However, it is preferable that the quantity of the impurities is as small as possible, and preferable that the amount of the impurities is smaller than or equal to 1 weight %.

The magnet alloy according to the present invention is produced by the following procedures. First, metal elements for the magnet alloy is mixed to achieve a desired composition. The properly mixed metal elements are melted by a commonly known melting method such as a high-frequency induction melting method under a vacuum or argon atmosphere, and an ingot of the desired-composition magnet alloy is obtained by solidifying the melted alloy. Thereafter, the rare earth magnet alloy such as a crystalline thin strip alloy according to the present invention is obtained by a quenching method such as a strip casting method wherein the melted magnet alloy is quenched and changes into crystalline thin strip alloy. Such a strip casting method is executed using a commonly known apparatus without specially improving this apparatus. It is of course that the improvement of the apparatus is preferable to further preferably obtain the desired magnet alloy.

Generally, it is difficult to uniquely determine a producing condition into one condition and it is necessary to properly set each condition according to the employed apparatus and the kind of alloys. In particular, it is important to finely control a cooling speed in producing the magnet alloy according to the present invention. If the cooling speed is out of the aimed cooling speed range, there will degrade the properties of the magnet alloy such that the size of crystals increases or the thin strip alloy degrades in homogeneity. For example, if the cooling speed is too high, the thickness of the thin strip alloy is decreased, and if too slow, the thickness of the thin strip alloy is increased. Thus, the cooling speed is closely related with the thickness of the thin strip alloy produced by the strip casting method. In producing the thin strip magnet alloy according to the present invention, it is preferable that the cooling speed is controlled such that the thickness of the thin strip alloy ranges from 30 to 300 µm. For example, it is preferable that the cooling speed is set at 1000° C./sec or more.

Powder of the rare earth magnet alloy is obtained by pulverizing the rare earth magnet alloy according to the present invention into powder. It is preferable that the pulverizing of the rare earth magnet alloy is executed using a ball mill. Another aspect of the present invention, therefore, resides in the powder of the rare earth magnet alloy which powder is obtained by pulverizing the rare earth magnet alloy according to the first aspect of the present invention using a ball mill. A further aspect of the present invention resides in a producing method of the rare earth magnet powder which is produced by pulverizing the rare earth magnet alloy of the first aspect of the present invention using a ball mill under a non-oxidizing atmosphere while adding dispersing agent.

It is preferable that the rare earth magnet alloy is pulverized into a size smaller than or equal to a size of the hard magnetic phase region using a ball mill. For example, when the size of the hard magnetic phase region is 0.5 µm, it is preferable that the rare earth magnet alloy is pulverized into a size smaller or equal to 0.5 µm. Usually, the magnet alloy is pulverized into powder having a size of sub-micron size ranging from 0.1 to 1.0 µm. In view of preferably realizing the magnetic field orientation of the magnet powder, it is preferable that the magnet alloy is pulverized into this sub-micron size. Although a lower limit of the size of the magnet powder is not determined, if the size of the magnet powder is too small, it becomes hard for the magnet powder to exhibit the magnetic field orientation. Further, the oxidation durability of the magnet powder degrades as the size of the magnet powder becomes smaller. Consequently, it is preferable that the size of the magnet powder is greater than or equal to 0.1 µm.

A type of the ball mill is not limited to a wet type or dry type. It is preferable that the magnet alloy is pulverized under a non-oxidizing atmosphere such as argon atmosphere or nitrogen atmosphere, in order to prevent the magnetic property of the magnet powder from being degraded by the oxidation of the magnet powder. When a wet type ball mill is employed in pulverizing the material, cyclohexane or the like is used. Further, in order to suppress the aggregation of the obtained powder, dispersion agent is employed. This also effectively functions in applying the magnetic field orientation to the produced magnet powder. A typical dispersion agent employed in a wet type ball mill is succinic acid, and a typical dispersion agent employed in a dry type ball mill is stearic acid. It was estimated on the basis of the magnetic measurement and the X-ray diffraction analysis that the as-milled powder was partially changed from crystalline to amorphous.

Further, by heat treating the powder obtained by pulverizing the magnet ally, the power changes into further improved powder of an anisotropic rare earth magnet alloy (exchange spring magnet) where there are mixed the soft magnetic phases and the hard magnetic phases whose axes of the easy magnetization are aligned. For example, it is preferable that the temperature of the heat treatment for the obtained powder is controlled within a range from 500 to 800° C.

The heat-treated magnet powder is therefore put in a condition that the hard magnetic phases and the soft magnetic phases are finely mixed. Further, the easy magnetization axes of the hard magnetic phases are aligned. As already explained, the mono-crystal-like hard magnetic phases function to pulverize the alloy into fine crystalline size hard magnetic phases during the ball mill process and to disperse fine soft magnetic phases in the hard magnetic phases.

Subsequently, the compressed powder body (green compact) is obtained by compressing the obtained power in a die while applying the magnetic field. The purpose of the magnetic field application is the magnetic field orientation of the powder to be compressed. The magnetic field orientation of the powder is basically completed by the application of the magnetic field before starting an actual compression of the powder. The device employed in the treatment for the magnetic field orientation and in the compressing process is not limited to a special device and may employ various commonly-known treatment means. For example, this means may include a means for compressing the magnet powder under a condition where the axes of easy magnetization of the magnet powder are aligned in the same direction by the application of the magnetic field. (Here, the axis of easy magnetization of the magnet powder is parallel to the axes of easy magnetization of the fine hard magnetic phases.) When this means is employed, it is appropriate that the compressing pressure is set within a range between from 1 to 5 tons/cm$^2$ and the magnetic field is set within a range between from 15 to 25 kOe. Also, it is preferable that the compressed powder body is produced using a die assembly for a discharge plasma sintering unit. That is, after compressing the powder in the die assembly and transferring to the discharge plasma sintering unit, the compressed powder body in the assembly die is sintered by the discharge plasma sintering unit while the compressing pressure is applied to the compressed power body via the assembly die. This sintering process is preferable in view of facilitating the workability of producing the magnet.

A bulk of the anisotropic exchange spring magnet is obtained by executing a sintering process of the obtained compressed powder body under a compressed state in a discharge plasma sintering unit. The use of the compressing and sintering technique in the discharge plasma enables the compressed powder body to be sintered at a relatively low temperature and thereby suppressing the formation of the coarse crystals and ensuring a magnet having the superior properties. Also, the discharge plasma compressing and sintering technique may be executed using a general device, such as a device "Model SPS-2040" made and sold by Izumitec Co. Ltd. and may be executed with a suitably improved device depending on a produced magnet to be obtained or a desired production line.

Accordingly, if the temperature of the discharge plasma compressing and sintering process is too high, there may cause forming the coarse crystals, degrading coercive force, and weakening the exchange coupling. In order to prevent these problems, it is preferable that the solidifying process is executed at a temperature equal to or less than 800° C., more preferably equal to or less than 700° C. In contrast, if the temperature of the discharge plasma compressing and sintering process is too low, the compressed powder body is insufficiently densified, and therefore it is preferable that the temperature during such process is maintained at a temperature equal to or higher than 600° C.

Further, it is preferable that such a compressing and sintering technique is executed under a reduced pressure using a rotary pump, and it is appropriate that the temperature is raised at a temperature raising rate of approximately 15 to 25 K/min. It is difficult to uniquely define a retaining time period of the compressing and sintering technique since there is a need for suitably changing the retaining time period according to various factors such as the device, the operating temperature, and the size of the compressed powder body. Generally, the retaining time period is set at a value within approximately 0 to 10 min. After the temperature is maintained for a predetermined time period, the compressed powder body is cooled in the sintering apparatus at a temperature lowering rate between approximately 10 to 30 K/min. In this instance, the compressing pressure for the compressing and sintering technique is appropriately selected from a range approximately from 1 to 10 tons/cm². The discharge plasma compressing and sintering process may be executed in a condition out of the above-discussed condition as far as the produced magnet has a crystalline size within an allowable range and maintains the desired magnetic property of the anisotropic rare earth magnet. The use of such discharge plasma compressing and sintering technique enables the bulk magnet with a low oxygen concentration to be produced and thereby improving the magnetic property of the produced magnet.

The magnitude of exchange-coupling is recognized from the magnitude of the spring back behavior. The heat-treated magnet powder exhibited the spring back phenomenon, although it is of course possible to check the spring back phenomenon from the finally obtained anisotropic exchange spring magnet. Further, as it will be predicted from the above discussion, the powder obtained by pulverizing the base material using a ball mill also exhibited the spring back phenomenon in the second and third quadrants of the magnetization curve.

The present invention provides a method of producing the Nd—Fe—B anisotropic exchange spring magnet in such a manner as described above. That is, a further aspect of the present invention resides in a producing method of the Nd—Fe—B anisotropic exchange spring magnet which method comprises a step of obtaining a compressed powder body by compressing the rare earth magnet powder according to the present invention at a compressing pressure ranging from 1 to 5 ton/cm² in a magnetic field ranging from 15 to 25 kOe, and a step of obtaining a bulk magnet by sintering the compressed powder body in a discharge plasma apparatus under a condition that a temperature is maintained within a range from 600 to 800° C. and a compressing pressure is maintained within a range from 1 to 10 ton/cm².

It is preferable that the Nd—Fe—B anisotropic exchange spring magnet according to this aspect of the present invention is a rare earth magnet having a bulk density greater than 95% of the true density of the rare earth magnet alloy. If the density of the exchange spring magnet is greater than 95% of the true density, the produced exchange spring magnet has a large energy product (BHmax).

The anisotropic exchange spring magnet according to the present invention is very variable as a use for various devices requiring high magnetic properties. For example, the anisotropic exchange spring magnet according to the present invention is applicable to a motor. If the magnet is employed as a part of a motor, it becomes possible to produce the motor into a further compacted size since the magnet according to the present invention has a magnetic flux larger than that of a conventional magnet. Further, the magnet according to the present invention has a superior thermal property. The magnet according to the present invention is advantageously applicable to a drive motor for an electric vehicle, a hybrid electric vehicle (HEV) and a fuel cell vehicle (FCV), due to the superior properties of the magnet. The reason that the magnetic flux of the magnet according to the present invention is greater than that of a sintered magnet depends on a fact that the exchange spring magnet according to the present invention contains soft magnetic phases. Further, it is deemed that the reason for performing the superior thermal property depends on the coercive force mechanism. That is, it is estimated that the coercive force mechanism of the magnet according to the present invention is similar to a pinning type although that of a common sintering magnet is a nucleation type. Due to this difference, it is seemed that the temperature stability of the magnet according to the present invention is improved.

Subsequently, there is discussed the present invention on the basis of EXAMPLES although the invention is not limited to these EXAMPLES.

EXAMPLE 1

A thin strip of the rare earth magnet alloy was produced from an alloy ingot having a composition of $Nd_{9.1}Fe_{75.8}Co_8B_{6.1}V_1$ by means of the strip casting method. A condition of the strip casting method was that a cooling speed for cooling the melted alloy to a solidification temperature of around 900° C. was set at 2300° C./sec. By observing a cross-section of the thin strip alloy by means of a SEM (scanning electron microscope), it was confirmed that the thin strip alloy had a mixed structure of the hard magnetic phases and the soft magnetic phases. Substantially the minimum width of the soft magnetic phase was smaller than or equal to 1 µm, and the minimum distance between the soft magnetic phases was greater than or equal to 0.1 µm. The thin strip alloy had a structure such that a surface of the thin strip facing a roller of the strip casting method was more micro-structured than that of the other surface. FIG. 1 is a SEM photograph showing a center area of a cross section of the obtained thin strip alloy. As discussed above, the whitish particles and the whitish needle like portions were precipitates of α-Fe, more restrictedly α-(Fe—Co). The other portion shown as a darkish region was the hard magnetic phase region.

Figure 2:
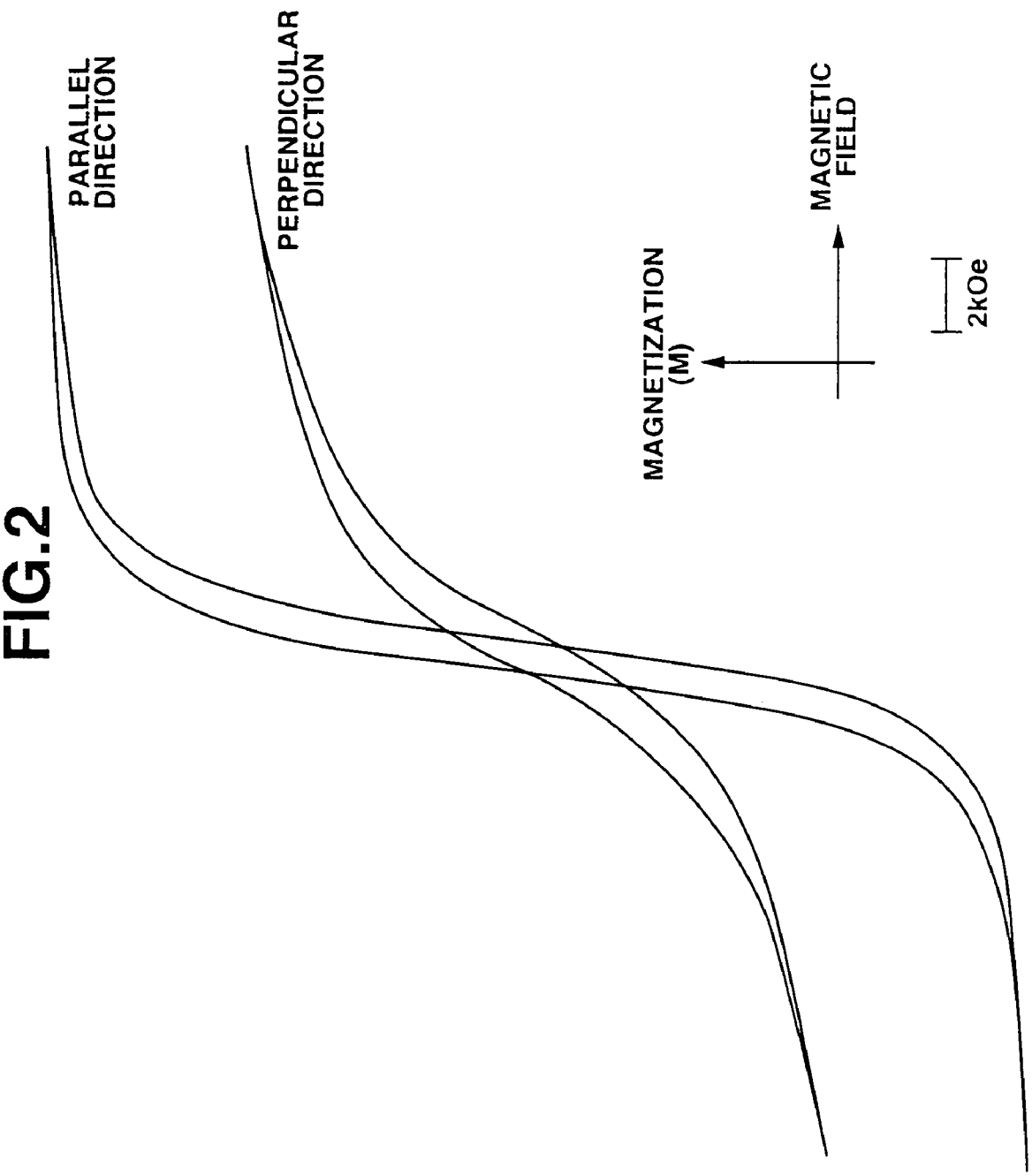
FIG. 2 is a graph showing magnetization curves of a VSM sample produced from a thin strip alloy of EXAMPLE 1.

Powder of a sample for VSM (vibrating sample magnetometer) was produced by pulverizing the thin strip alloy into a size smaller than 25 µm using a set of mortar and pestle. The VSM sample was produced by mixing the obtained powder with epoxy adhesive and by solidifying the mixture poured in a VSM sample container in the magnetic field of 10 kOe. Magnetization curves of the obtained VSM sample were measured using a VSM wherein the maximum applied magnetic field of 16 kOe was applied to the VSM sample. More specifically, the magnetization curves are respectively measured as to a parallel direction setting in that a direction of the magnetic field applied by the VSM is parallel to the magnetic field direction applied during the sample producing process and as to a perpendicular direction setting in that a direction of the magnetic field applied by the VSM is perpendicular to the magnetic field direction applied during the sample producing process. Further, Js ratio (a ratio of the magnetization in the parallel direction with respect to the magnetization in the perpendicular direction) at the magnetic field of 16 kOe was evaluated. The magnitude of the Js ratio reflects that the hard magnetic phase region is large and the hard magnetic phase constructs a texture. FIG. 2 shows an example of the measured result wherein the Js ratio was 1.7.

Figure 3:
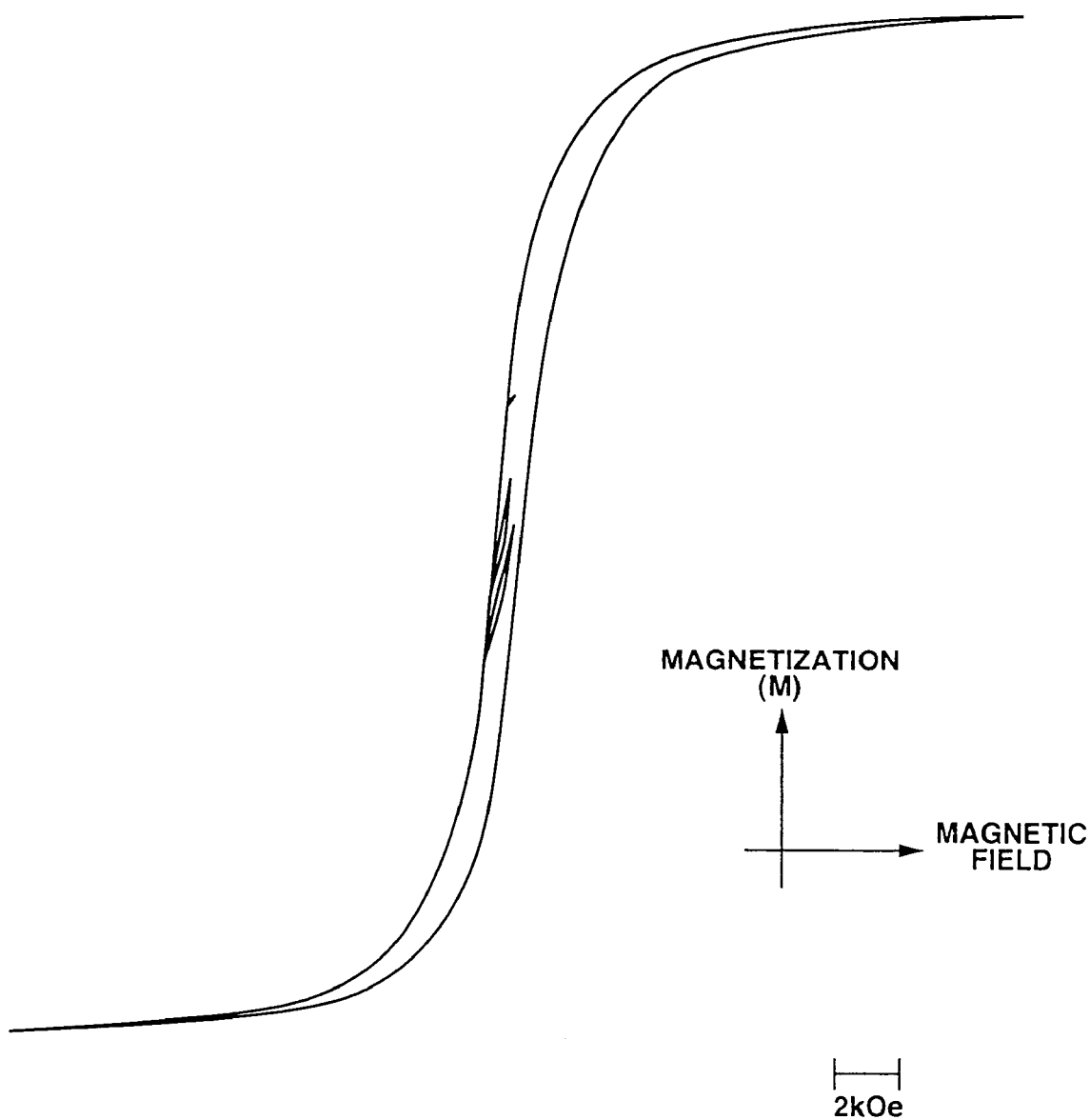
FIG. 3 is a graph showing magnetization curves measured for checking a spring back phenomenon of the thin strip alloy of EXAMPLE 1.
Figure 4:
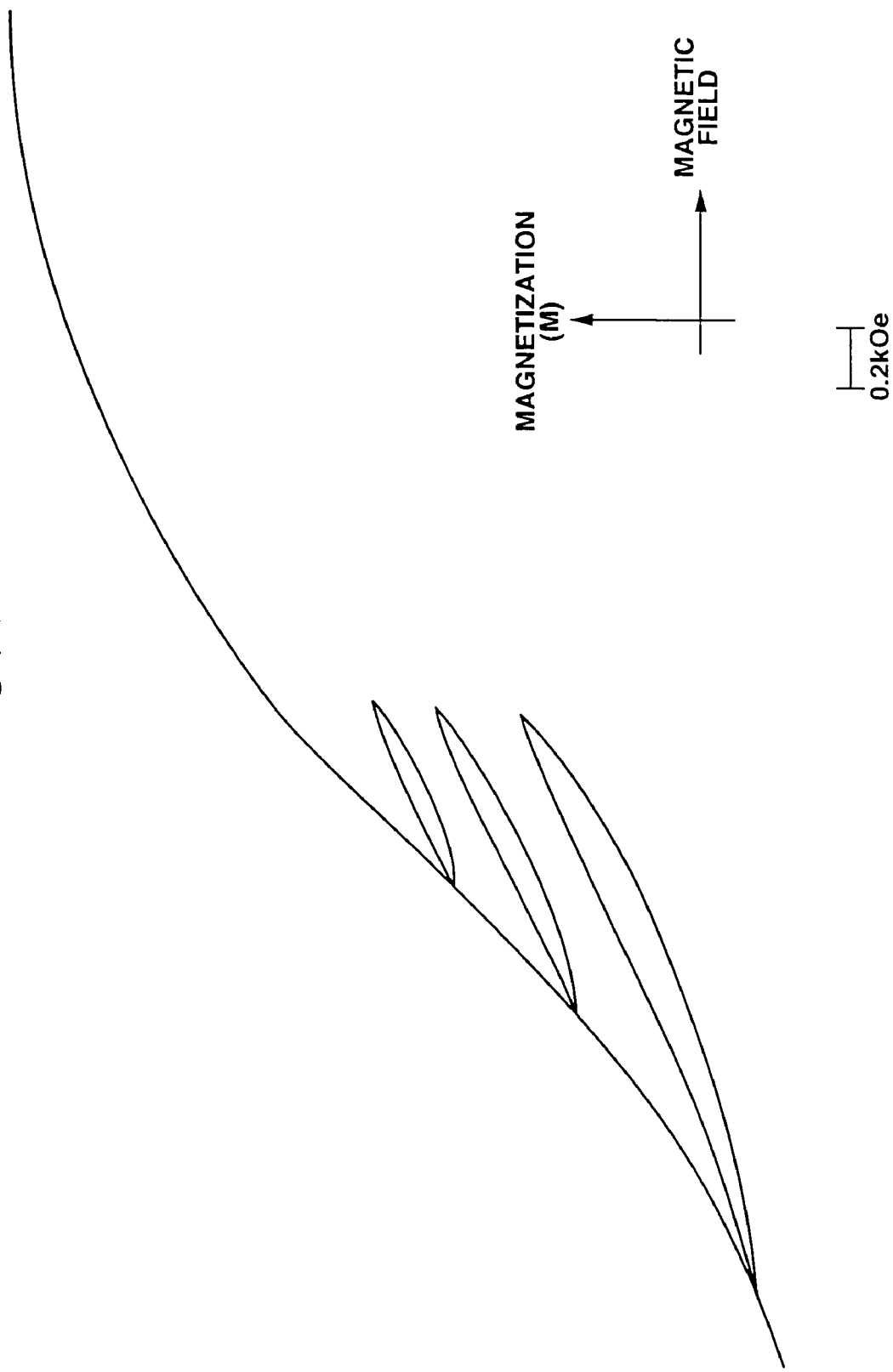
FIG. 4 is an enlarged view of the graph of FIG. 3 amplified in the horizontal axis ten times.

Another VSM sample of the obtained thin strip alloy was produced by means of the same method employed in the above production, and the magnetization curve in the parallel direction with respect to the direction of the magnetic field orientation of the produced sample was measured as shown in FIGS. 3 and 4. FIG. 4 is a magnetization curve where the horizontal axis was elongated ten times that of FIG. 3. As is recognized from FIGS. 3 and 4, the VSM sample of the obtained thin strip alloy also exhibited the spring back phenomenon. More specifically, when the decreased magnetic field was inversely increased in the second and third quadrants of the magnetization curve in the parallel direction, the magnetization is increased as shown in FIG. 4. Thereafter, when the measured magnetic field is decreased, the increased curve was returned to a start point of the inverse increase of the measured magnetic field. This behavior was like as a spring characteristic, and thereby called the spring back phenomenon (exchange spring behavior). In the normal magnetization, the magnetization does not increase by inversely increasing the measured magnetic field in the way of decreasing the measured magnetic field such in the second and third quadrants of the magnetization curve in the parallel direction. This spring back phenomenon exhibits that the hard magnetic phase and the soft magnetic phase are adjacently located, and that the interaction therebetween is strong.

A feature of the present invention is that a rare earth magnet alloy is crystalline. In order to check this feature, a differential thermal analysis (DTA) was executed. As a result of this analysis, no clear thermal peak was found.

Figure 5:
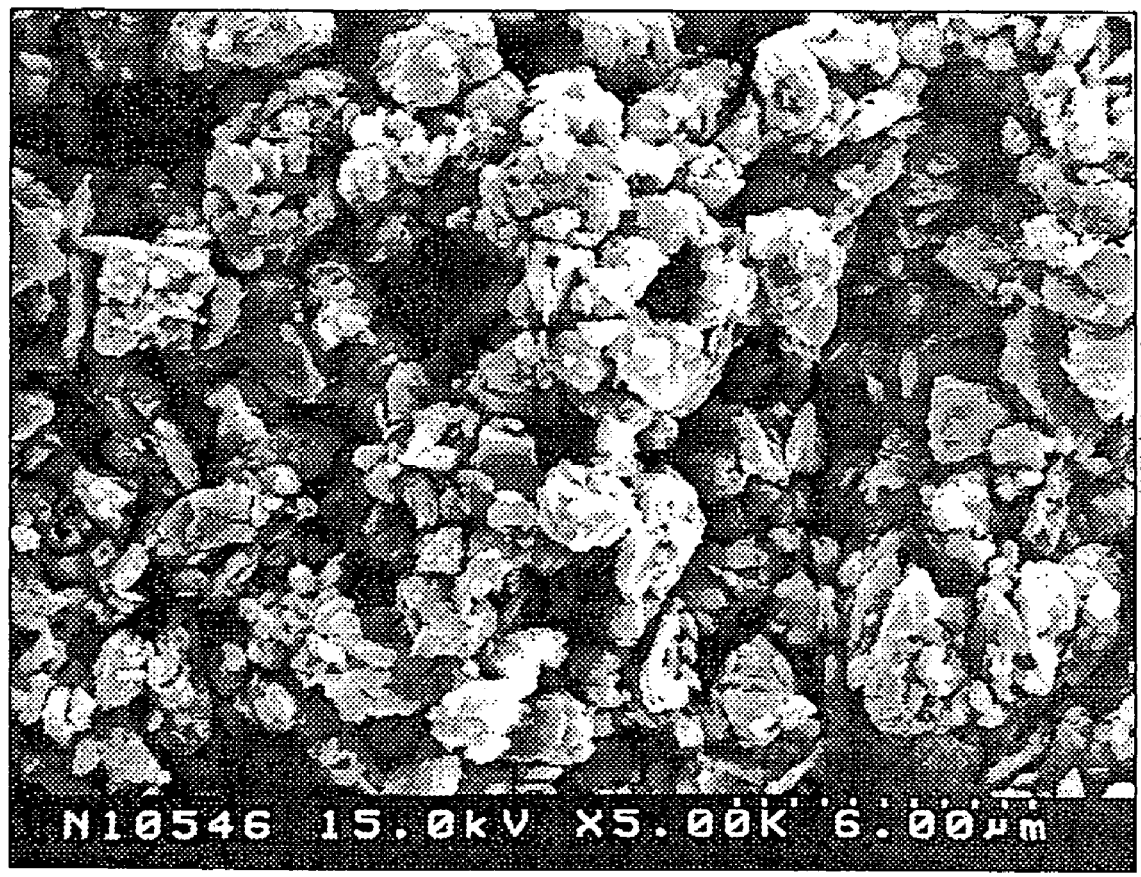
FIG. 5 is a scanning electron microscope (SEM) photograph showing powder of the rare earth magnet alloy (having a composition of $Nd_{9.1}Fe_{75.8}Co_8B_{6.1}V_1$) of EXAMPLE 1.

The obtained thin strip alloy was pulverized using a wet-type ball mill wherein the milling operation was executed using cyclohexane under argon atmosphere, and polybutenyl-succinimide-tetraethylenepentamine (1300 molecular weight) was used as dispersant. This dispersant included a small quantity of mineral oil. The obtained powder (rare earth magnet powder) was observed using the SEM. FIG. 5 shows a SEM photograph of the obtained powder whose powder sizes were smaller than or equal to 1 μm and wherein there was found no powder larger than 1 μm in powder size.

Figure 6:
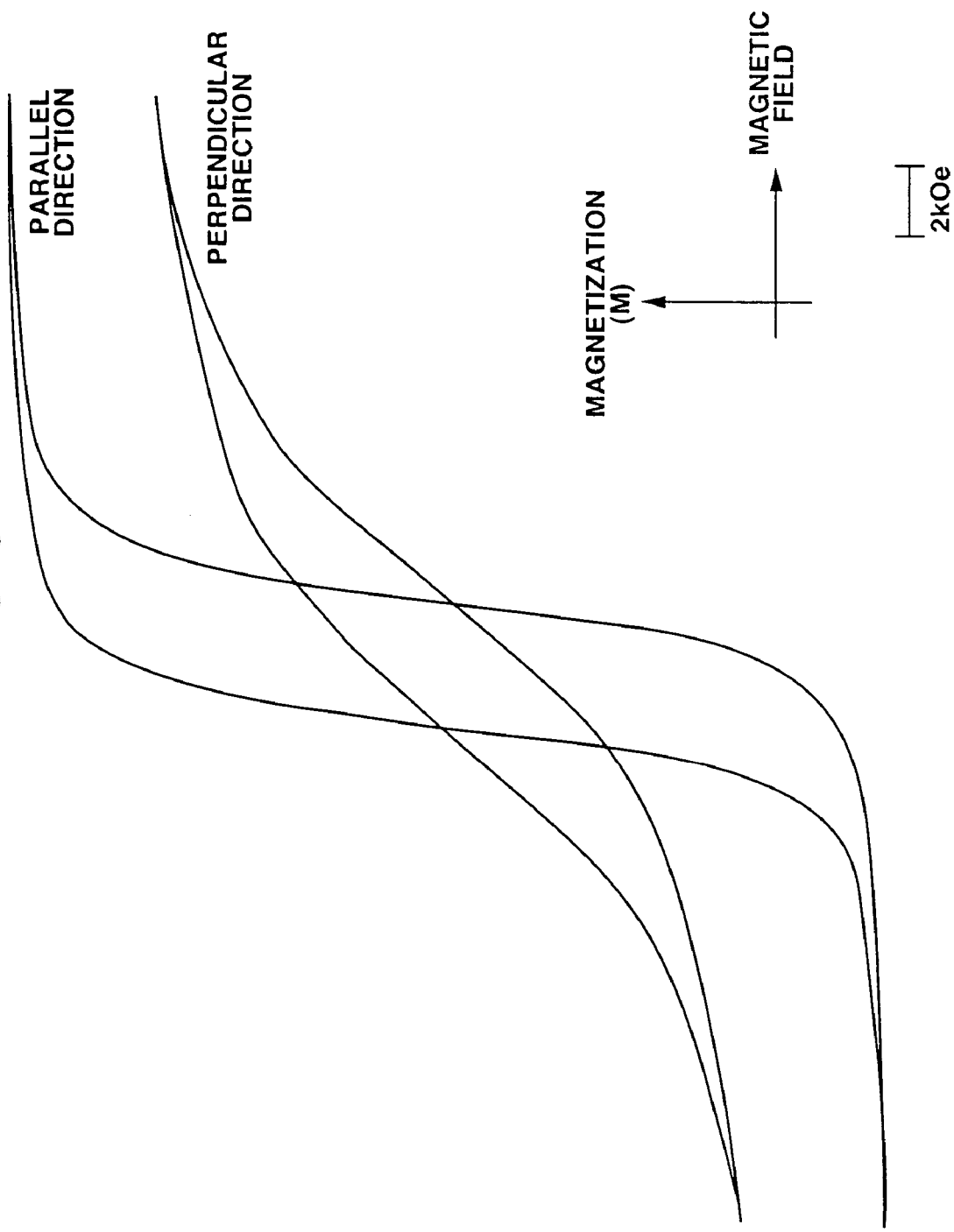
FIG. 6 is a graph showing magnetization curves of a VSM sample produced from the as-milled magnet powder of EXAMPLE 1.
Figure 7:
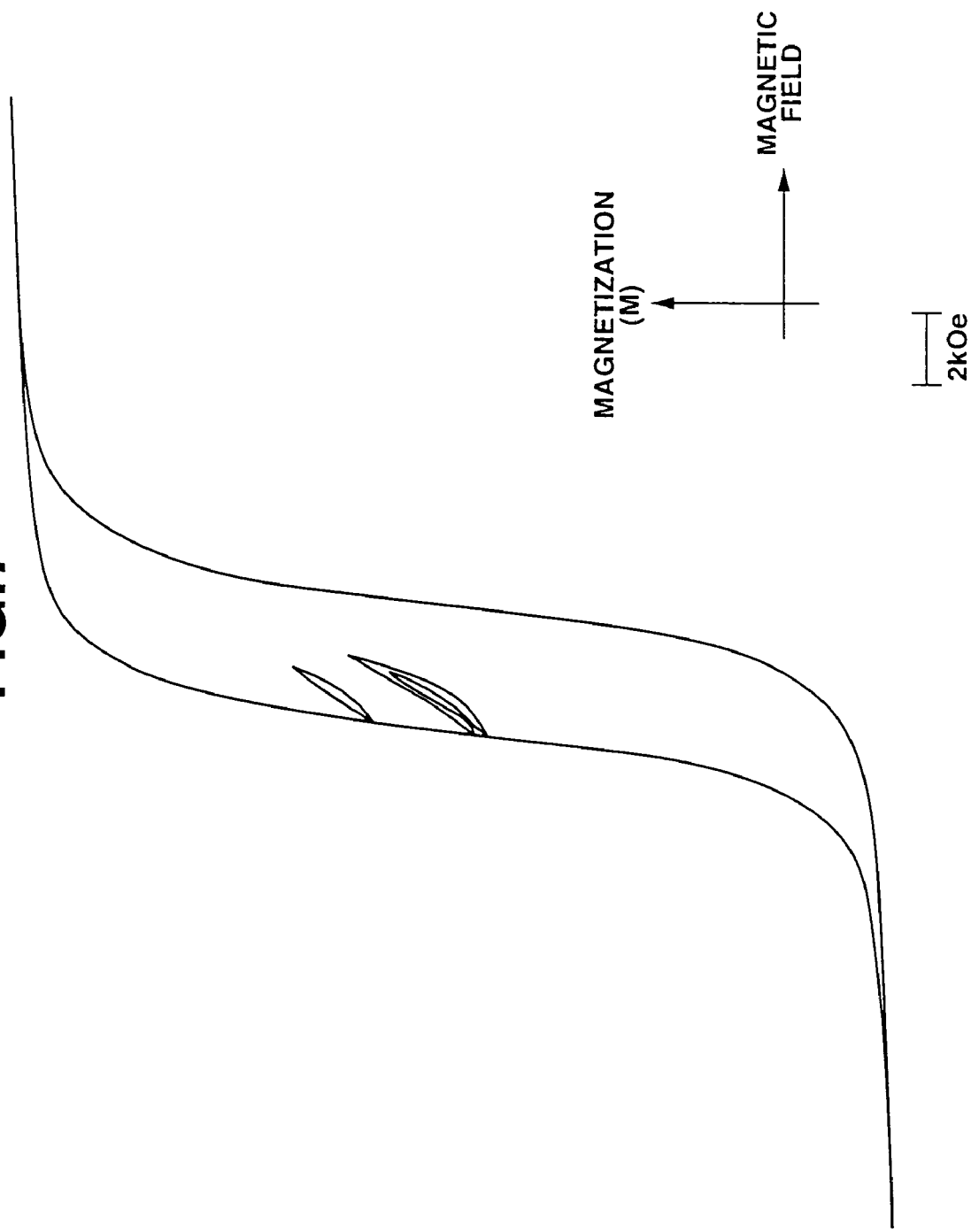
FIG. 7 is a graph showing magnetization curves for checking the spring back phenomenon of FIG. 6 in the parallel direction.

As to the as-milled powder, a VSM sample was produced in the same manner as discussed above, and the magnetization curves thereof were also measured. The measurement result of the magnetization curves are shown in FIG. 6 wherein Js ratio thereof was 1.5. This means that the obtained powder also exhibited the anisotropy. As the coercive force thereof increased as compared with that in FIG. 2, it is estimated that the hard magnetic phase thereof was a fine grained structure. FIG. 7 distinctively shows the spring back phenomenon represented in the magnetization curve along the parallel direction in FIG. 6.

Figure 8:
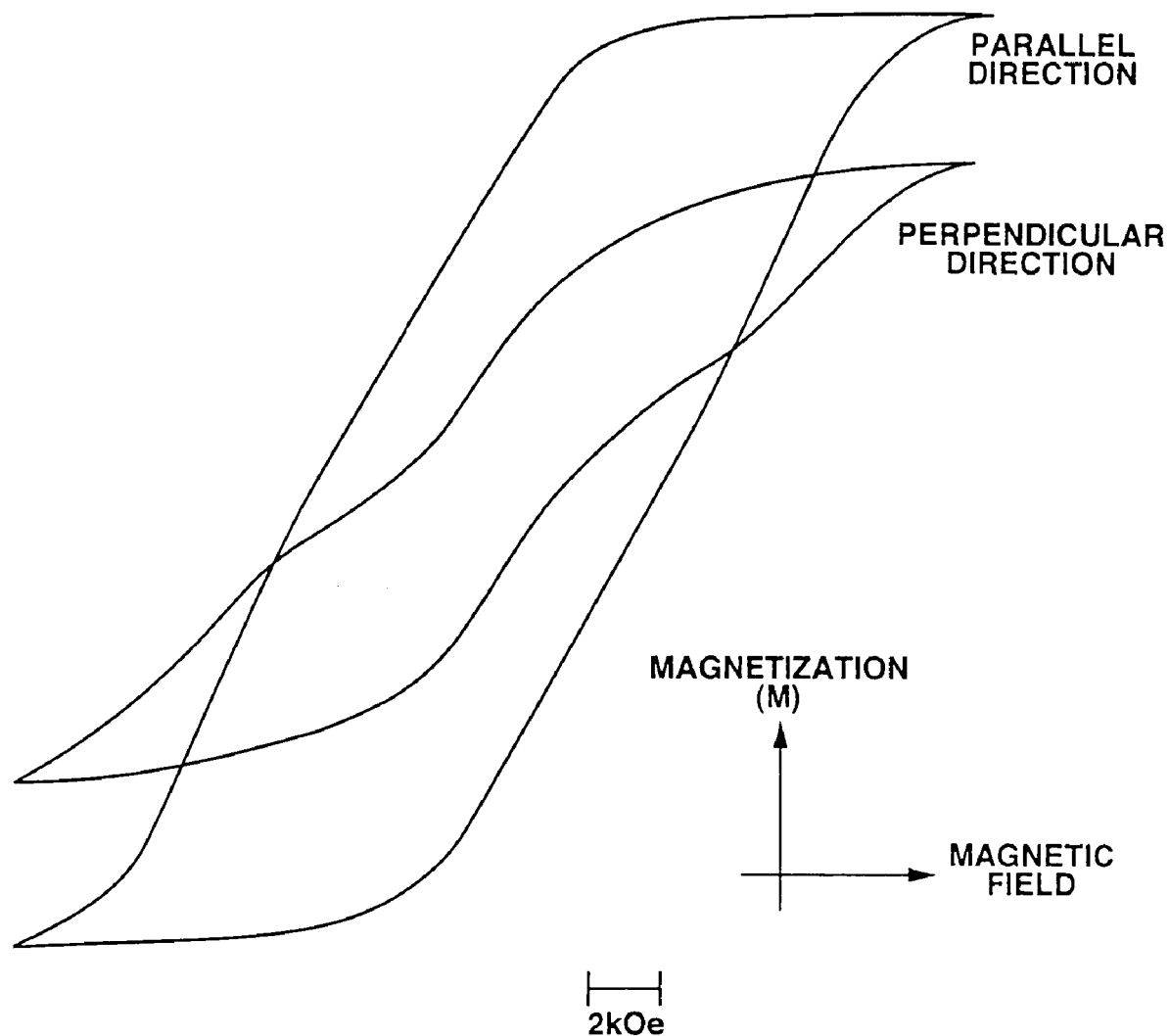
FIG. 8 is a graph showing magnetization curves of a VSM sample produced from heat-treated magnet powder of EXAMPLE 1.

The magnet powder obtained by pulverizing the base material was heat treated at 612° C. Then, as to the VSM sample of the obtained heat-treated magnet powder, the magnetization curves thereof were also measured. The measurement result of the magnetization curves are shown in FIG. 8 wherein the heat-treated magnet powder exhibited the anisotropy and the Js ratio thereof was around 1.4 which is a reference value. Since the heat-treated powder was put in a flocculated state, the magnetic field orientation in the VSM sample was insufficient and therefore the Js ratio was around 1.4. By further pulverizing the heat-treated powder by means of a set of mortar and pestle so as to release the flocculated state in some degree, a VSM sample thereof was produced, and the magnetization curves thereof were measured. As a result, it was recognized that the Js ratio was largely improved. The coercive force of this sample was largely increased as compared with that shown in FIG. 6 and was 6.4 kOe. As a result of observing the structure of this powder, the hard magnetic phases and the soft magnetic phases were finely dispersed to form a mixed structure of the hard magnetic phases and the soft magnetic phases.

Figure 9:
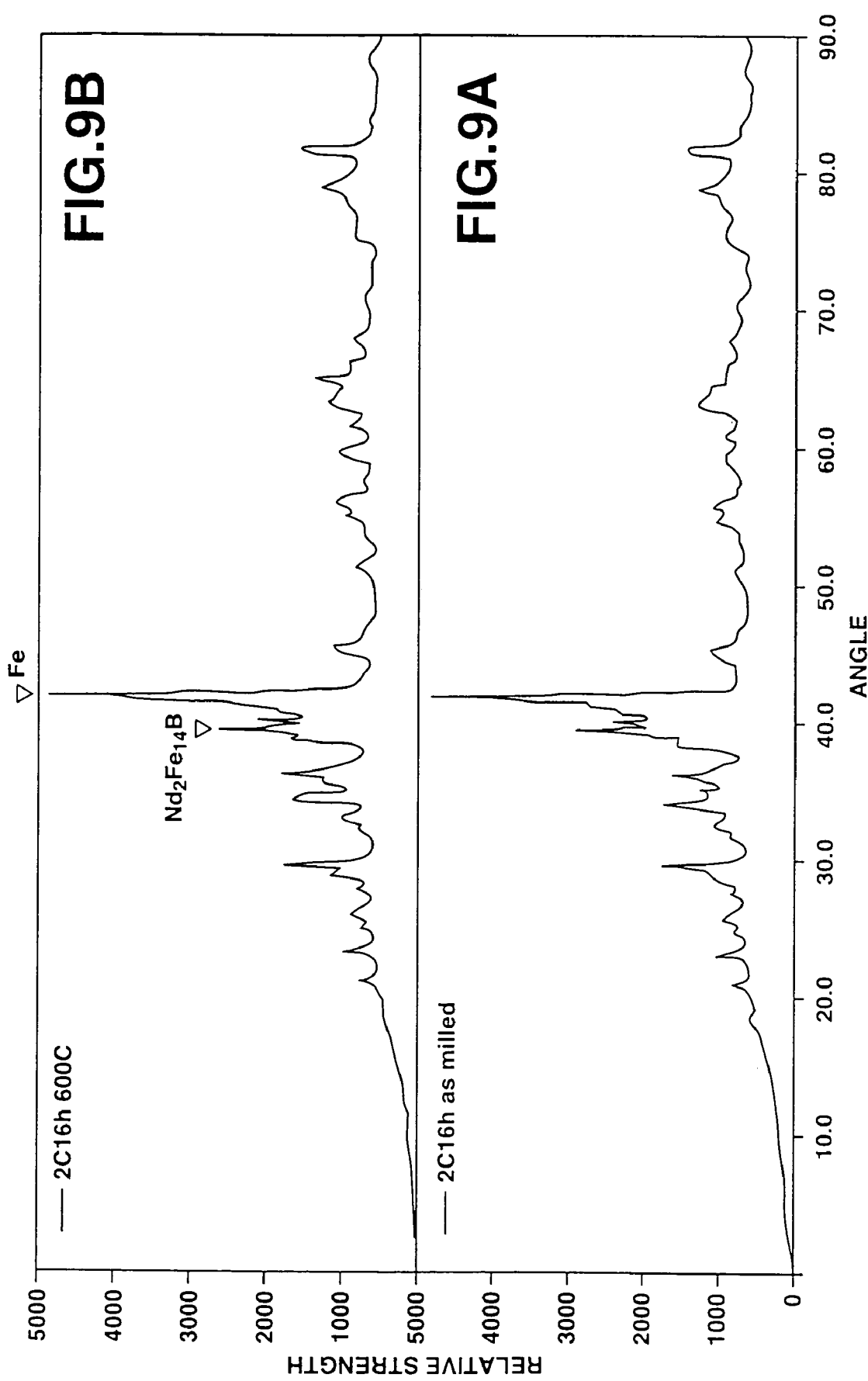
FIGS. 9A and 9B are charts showing X-ray diffraction analysis results of the as-milled powder (A) of EXAMPLE 1 and the powder (B) which was obtained by heat treating the powder (A) at 612° C.

FIGS. 9A and 9B show X-ray diffraction results of the as-milled powder (a) and the powder (b) heat-treated at 612° C., respectively. As is apparent from FIGS. 9A and 9B, the diffraction peaks of the powder (b) are sharpened. It is therefore assumed that the as-milled powder (a) still remains relatively large quantity of stains therein, or includes amorphous phases.

EXAMPLE 2

A thin strip of the rare earth magnet alloy was produced from an alloy ingot having a composition of $Nd_{10}Fe_{75}Co_8B_6V_1$ by means of the strip casting method and in the same manner as EXAMPLE 1. It was observed that the thin strip alloy has had a mixed structure of the hard magnetic phases and the soft magnetic phases, as a result of observing a cross-section of the thin strip alloy by means of SEM. Substantially the minimum width of the soft magnetic phases was smaller than or equal to 1 μm, and the minimum distance between the soft magnetic phases was greater than or equal to 0.2 μm. Powder for a VSM sample was produced by pulverizing the thin strip alloy into a size smaller than 25 μm using a set of mortar and pestle. The Js ratio of the VSM sample was 1.8.

EXAMPLE 3

A thin strip of the rare earth magnet alloy was produced from an alloy ingot having a composition of $Nd_{11}Fe_{74}Co_8B_6V_1$ by means of the strip casting method and in the same manner as EXAMPLE I. It was observed that the thin strip alloy has had a mixed structure of the hard magnetic phases and the soft magnetic phases, as a result of observing a cross-section of the thin strip alloy by means of SEM. Substantially the minimum width of the soft magnetic phase was smaller than or equal to 1 μm, and the minimum distance between the soft magnetic phases was greater than or equal to 0.5 μm. Powder of a VSM sample was produced by pulverizing the thin strip alloy into a size smaller than 25 μm using a set of mortar and pestle. The Js ratio of the VSM sample was 1.8.

COMPARATIVE EXAMPLE 1

A thin strip of the rare earth magnet alloy was produced from an alloy ingot having a composition of $Nd_8Fe_{77}Co_8B_6V_1$ by means of the strip casting method and in the same manner as EXAMPLE 1. It was observed that the thin strip alloy has had a mixed structure of the hard magnetic phases and the soft magnetic phases, as a result of observing a cross-section of the thin strip alloy by means of SEM. There were a lot of the soft magnetic phases whose minimum widths were greater than 1 μm and were substantially not smaller or equal to 1 μm. Further, there was a tendency that the minimum distance between the soft magnetic phases was smaller than 0.1 μm. Powder of a VSM sample was produced by pulverizing the thin strip alloy into a size smaller than 25 μm using a set of mortar and pestle. The Js ratio of the VSM sample was 1.2.

EXAMPLE 4

Figure 10:
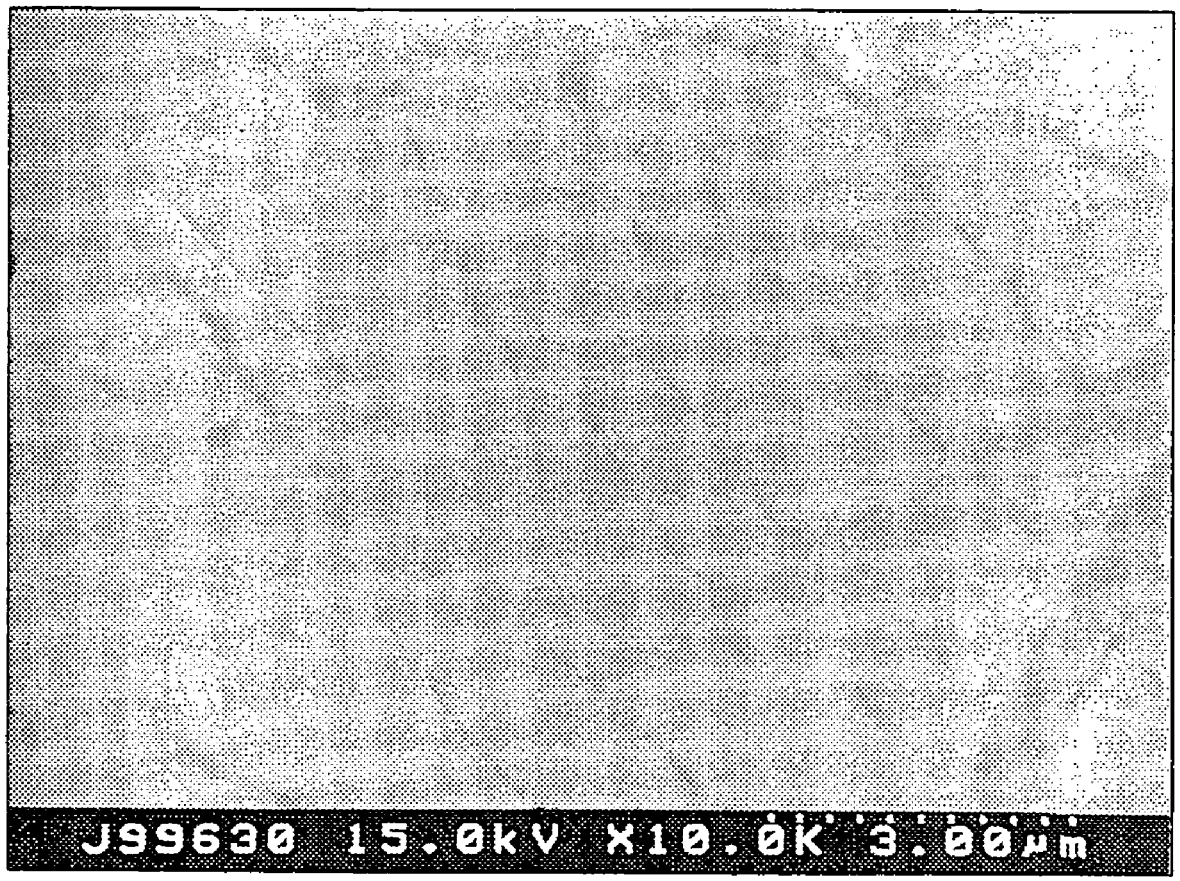
FIG. 10 is a SEM photograph showing a cross section of the rare earth magnet alloy (having a composition of $Nd_{11}Fe_{72}Co_8B_{7.5}V_{1.5}$) of EXAMPLE 4.

A thin strip of the rare earth magnet alloy was produced from an alloy ingot having a composition of $Nd_{11}Fe_{72}Co_8B_{7.5}V_{1.5}$ by means of the strip casting method and in the same manner as EXAMPLE 1. A condition of the strip casting method for producing EXAMPLE 4 was that a cooling speed for cooling the material to the solidification temperature of around 900° C. was 2000° C./sec. It was observed that the thin strip alloy has had a mixed structure of the hard magnetic phases and the soft magnetic phases, as a result of observing a cross-section of the thin strip alloy by means of SEM. Substantially the minimum width of the soft magnetic phase was smaller than or equal to 1 μm, and the minimum distance between the soft magnetic phases was greater than or equal to 1 μm. FIG. 10 is a SEM photograph showing a center area of a cross section of the obtained thin strip alloy. Black stripes aligned along the direction from a left upper side toward a right lower side are the soft magnetic phases of α-(Fe—Co). The other regions are the hard magnetic phase regions. That is, the hard magnetic phases are separated by the soft magnetic phases of stripes.

Figure 11:
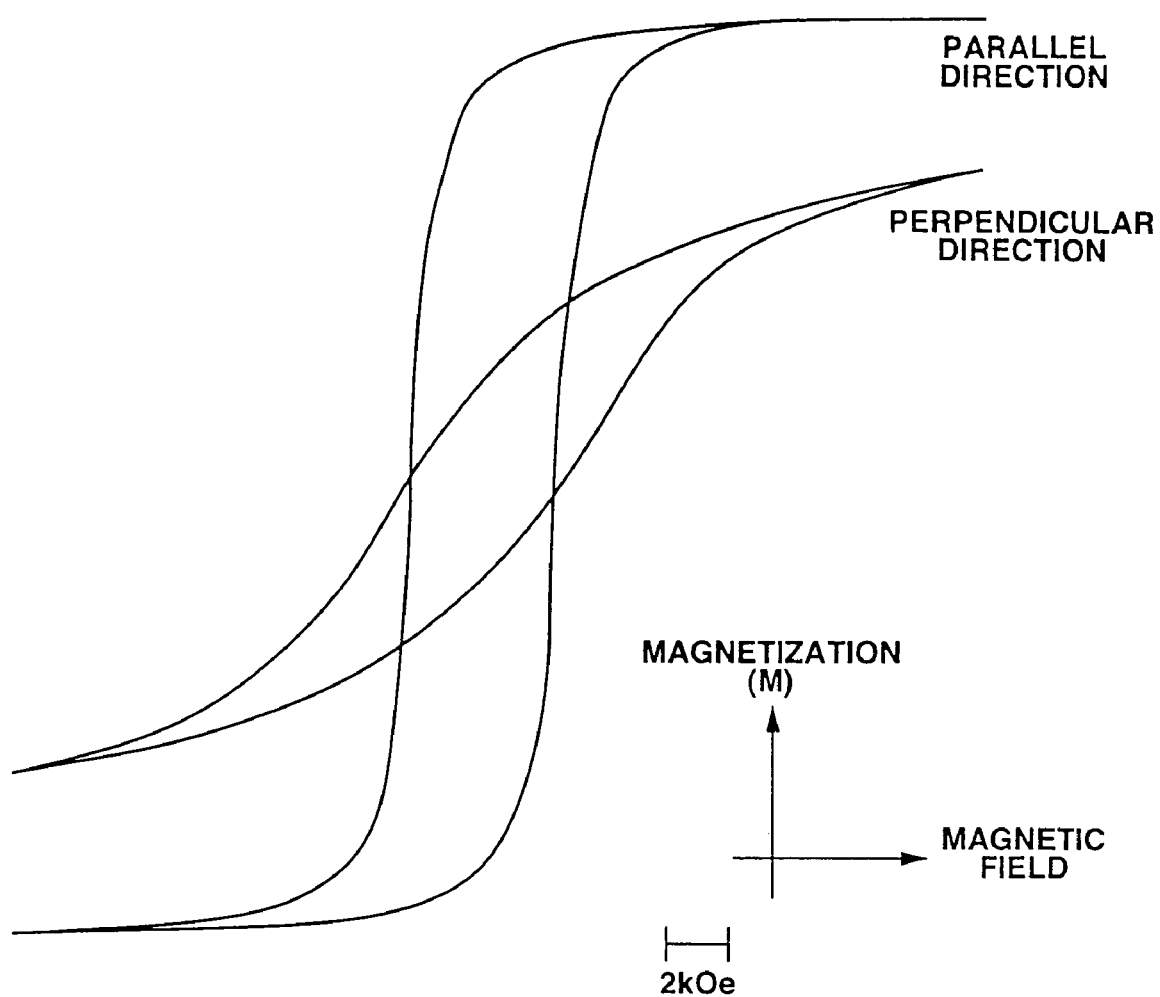
FIG. 11 is a graph showing magnetization curves of a VSM sample produced from the as-milled powder of EXAMPLE 4.
Figure 12:
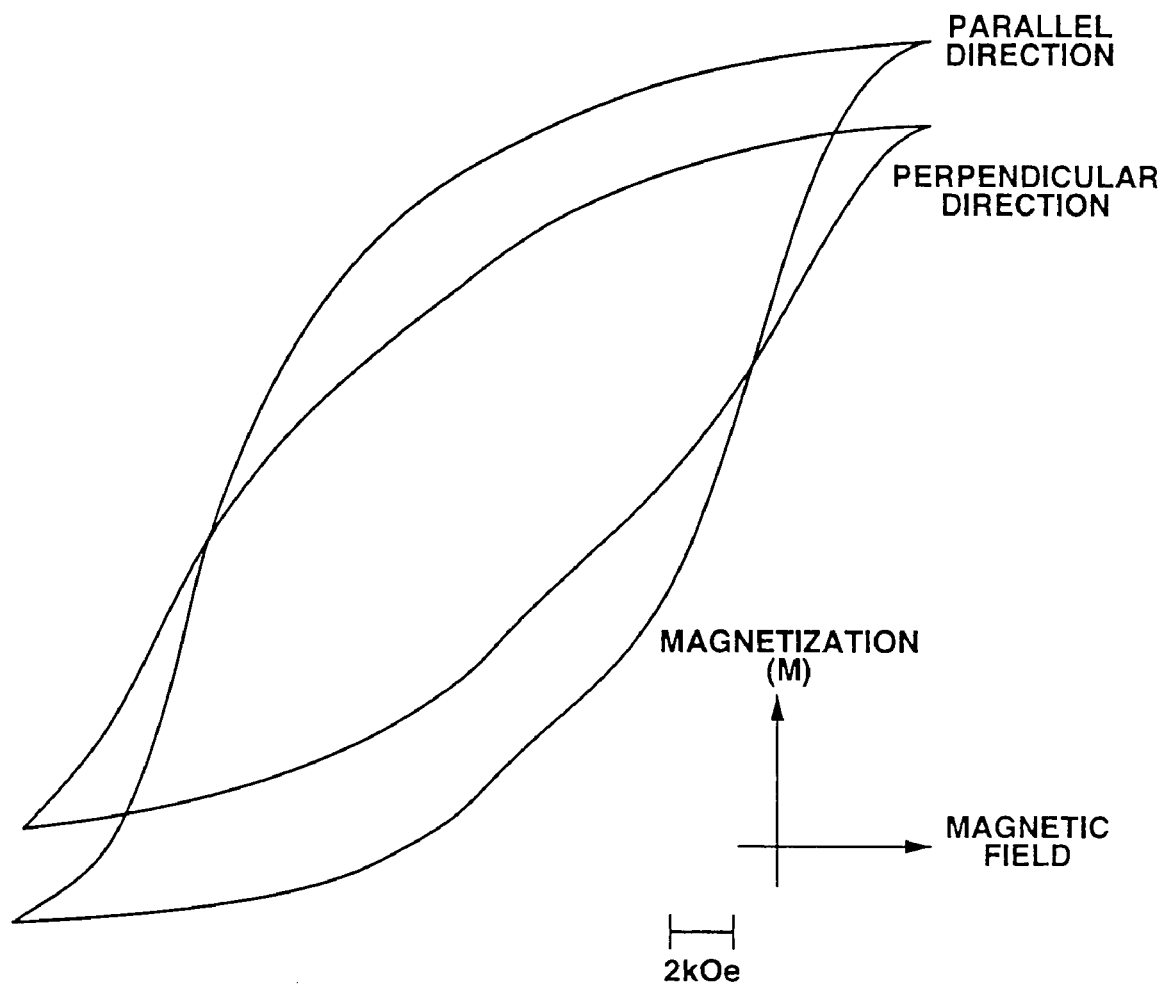
FIG. 12 is a graph showing magnetization curves of a VSM sample produced from the heat-treated magnet powder of EXAMPLE 4.
Figure 13:
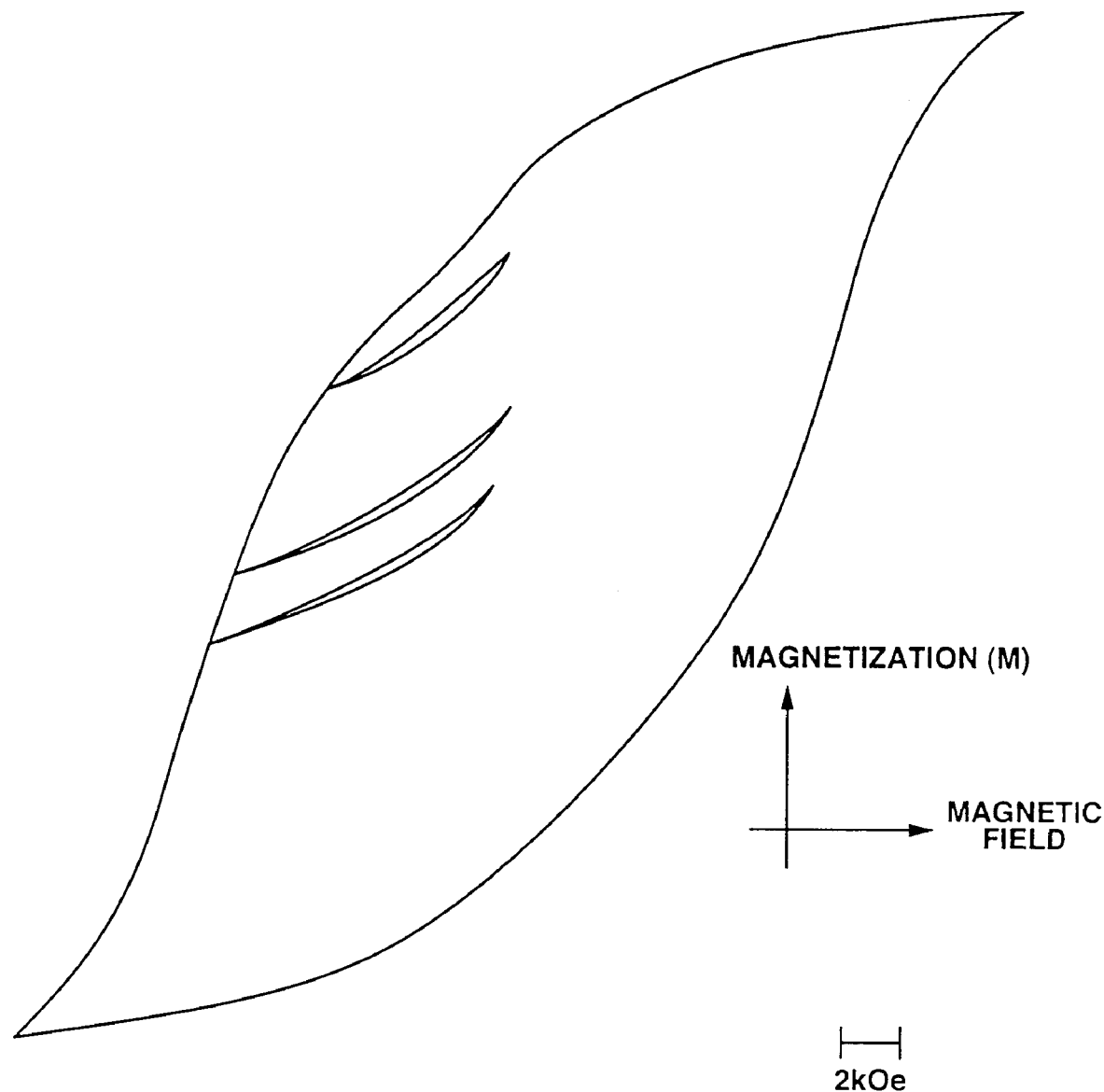
FIG. 13 is a graph showing magnetization curves for checking the spring back phenomenon of the heat-treated magnet powder of EXAMPLE 4.

As to the as-milled powder, a VSM sample was produced in the same manner as EXAMPLE 1, and the magnetization curves thereof were also measured. The measurement result of the magnetization curves were shown in FIG. 11 wherein Js ratio thereof is a value slightly greater than 1.5. It is assumed that even when the powder is obtained by means of a ball mill, the same result with EXAMPLE 1 is obtained. FIG. 12 shows the magnetization curves of the powder heat-treated at 610° C. The coercive force thereof was 9.0 kOe and was greater than that in FIG. 11. The reason for taking a small Js ratio is the same as discussed above. That is, since the heat-treated powder is put in flocculated state, the magnetic field orientation in the VSM sample is not sufficiently achieved. FIG. 13 shows a magnetization curve of a sample produced in the same manner as that in FIG. 12 in order to observe the spring back phenomenon. As a result, this heat-treated magnet powder exhibited the spring back phenomenon.

In order to find a preferred condition of the discharge plasma sintering, the following experiments were carried out.

REFERENCE EXAMPLE 1

Rare earth magnet powder was obtained in the same manner as EXAMPLE 1, that is, by pulverizing the thin strip of the rare earth magnet alloy using a wet-type ball mill. A compressed powder body was produced by compressing the rare earth magnet powder at a pressure of 2 ton/cm² while treating the magnetic field orientation by applying the magnetic field of 20 kOe. A die employed in this compressing process was a non-magnetic WC type. The size of the compressed powder body was 10 mm×10 mm×7 mm.

A Nd—Fe—B type anisotropic exchange spring magnet was obtained by forming a bulk from the compressed powder body by means of the discharge plasma sintering unit under a condition that the temperature is maintained at 650° C. for 3 minutes while the compressing pressure of 9 ton/cm² is applied to the compressed powder body. The density of the exchange spring magnet reached the true density.

The obtained exchange spring magnet was observed using SEM and TEM. As a result of these observations, the obtained magnet had a mixed structure of hard magnetic phases and soft magnetic phases. The crystalline grain size of the obtained magnet had a range from 15 to 40 nm. It was observed by TEM that the direction of the hard magnetic phases was aligned.

REFERENCE EXAMPLE 2

A Nd—Fe—B type anisotropic exchange spring was obtained in the same manner as REFERENCE EXAMPLE 1 except that the compressing pressure during the discharge plasma sintering was 8 ton/cm². The exchange spring magnet had a density which is 95% of the true density.

REFERENCE EXAMPLE 3

A Nd—Fe—B type anisotropic exchange spring was obtained in the same manner as REFERENCE EXAMPLE 1 except that the compressing pressure during the discharge plasma sintering was 7 ton/cm². The obtained exchange spring magnet had a density which is 90% of the true density.

REFERENCE EXAMPLE 4

A Nd—Fe—B type anisotropic exchange spring was obtained in the same manner as REFERENCE EXAMPLE 1 except that the temperature during the discharge plasma sintering was 810° C. The obtained exchange spring magnet had the true density.

The magnetization curves of REFERENCE EXAMPLES 1 through 4 were measured using a direct-current BH curve tracer which is capable of applying the maximum applied magnetic field of 20 kOe to the samples. TABLE 1 shows the magnetization ratio (Js ratio 2) between the magnetization in the direction of the magnetic field orientation and the magnetization in the direction perpendicular to the magnetic field orientation at the magnetic field of 20 kOe. The Js ratio 2 of REFERENCE EXAMPLE 1 was 1.8 and was greater than Js ratio (1.7) of EXAMPLE 1. Further, TABLE 1 shows energy product (BHmax) obtained from each magnetization curve. As to the coercive force, REFERENCE EXAMPLES 1 through 3 took values around 7.0 kOe, and REFERENCE EXAMPLE 4 took 5.0 kOe. TABLE 1 clearly represents that it is preferable that the density of the magnet is greater than 95% of the true density and that the sintering temperature in the discharge plasma apparatus is lower than or equal to 800° C.

TABLE 1

| | COMPOSITION (atom %) | Js ratio 2 | BHmax (MGOe) |
|---|---|---|---|
| REF. EXAMPLE 1 | $Nd_{9.1}Fe_{75.8}Co_8B_{6.1}V_1$ | 1.8 | 25 |
| REF. EXAMPLE 2 | $Nd_{9.1}Fe_{75.8}Co_8B_{6.1}V_1$ | 1.8 | 20 |
| REF. EXAMPLE 3 | $Nd_{9.1}Fe_{75.8}Co_8B_{6.1}V_1$ | 1.8 | 18 |
| REF. EXAMPLE 4 | $Nd_{9.1}Fe_{75.8}Co_8B_{6.1}V_1$ | 1.5 | 15 |

EXAMPLE 5

Figure 14:
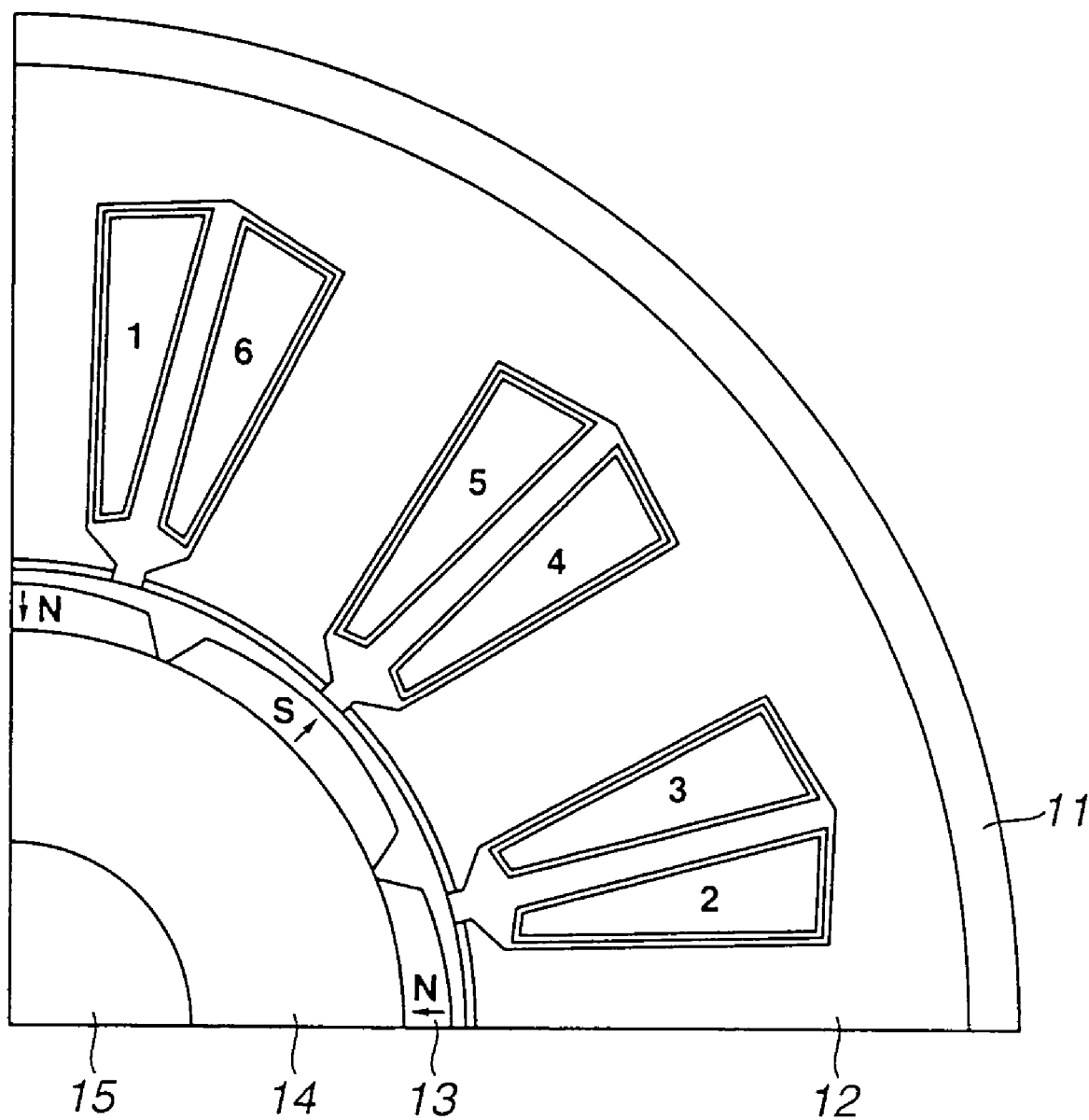
FIG. 14 is a cross sectional view showing a ¼ part of a concentrated winding and surface permanent magnet type motor employing the exchange spring magnet.

The exchange spring magnet of REFERENCE EXAMPLE 1 was applied to a surface permanent magnet motor having a 12-pole stator and 8-pole rotor. FIG. 14 is a cross section of ¼ part of the surface permanent magnet motor of a concentrated winding type to which the exchange spring magnet is applied. An outer side of the motor in FIG. 14 is an aluminum case 11, and an inner side thereof is the stator 12 having 52 mm inner diameter and 108 mm outer diameter. 1-2 is u-phase coil, 3-4 is v-phase coil, and 5-6 is w-phase coil. Stator 12 is a laminated member of electrical steel sheets. A plurality of magnets 13 are installed in a rotor core 14. The maximum outer diameter of the rotor is 50.7 mm, and the total thickness of the stator and the rotor was 79.8 mm.

The performance of the motor was that the maximum rated output was 2 kW, the temperature limitation was 160° C. The coercive force of the exchange spring magnet was 7.2 kOe. On the other hand, if a conventional Nd—Fe—B sintered magnet is employed in a motor, the magnet is required to have the coercive force more than 19.8 kOe in order to ensure the temperature limit as same as that using the magnet of REFERENCE EXAMPLE 1. That is, the motor employing the magnet according to the present invention gave a superior performance in thermal design.

This application is based on prior Japanese Patent Application No. 2002-328579. The entire contents of the Japanese Patent Application No. 2002-328579 with a filing date of Nov. 12, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A Nd—Fe—B type rare earth magnet alloy for a Nd—Fe—B type anisotropic exchange spring magnet comprising:
   hard magnetic phases and soft magnetic phases;
   wherein a minimum width of the soft magnetic phases is smaller than or equal to 1 μm;
   a minimum distance between the soft magnetic phases is greater than or equal to 0.1 μm; and a composition of the Nd—Fe—B type rare earth magnet alloy is expressed by the following chemical formula (1)

$$Nd_xFe_{100-x-y-z}B_yV_z \qquad (1)$$

where x is within a range from 9 to 11, y is within a range from 5 to 8 and z is within a range from 0 to 2, wherein chemical formula (1) optionally comprises Co, and if Co is present in the alloy 0.01 to 30 atom % of Fe is replaced with Co.

2. The Nd—Fe—B type rare earth magnet alloy as claimed in claim 1, wherein 0.01 to 80 atom % of Nd is replaced with Pr.

3. The Nd—Fe—B type rare earth magnet alloy as claimed in claim 1, wherein 0.01 to 10 atom % of Nd is replaced with Dy or Tb.

4. The Nd—Fe—B type rare earth magnet alloy as claimed in claim 1, wherein Fe or Co are replaced by at least one element selected from the group consisting of Al, Mo, Zr, Ti, Sn, Cu, Ga and Nb, a summed amount of the at least one element being 0.1 to 3 atom % of a total amount of the Nd—Fe—B type rare earth magnet alloy.

5. The Nd—Fe—B type rare earth magnet alloy as claimed in claim 1, wherein the Nd—Fe—B type rare earth magnet alloy is a thin strip crystalline alloy produced by a strip casting method.

6. The Nd—Fe—B type rare earth magnet alloy as claimed in claim 5, wherein a thickness of the thin strip alloy is within a range from 30 to 300 μm.

7. Powder of a Nd—Fe—B type rare earth magnet alloy, the Nd—Fe—B type rare earth magnet alloy comprising:
   hard magnetic phases and soft magnetic phases,
   wherein a minimum width of the soft magnetic phases is smaller than or equal to 1 μm;
   a minimum distance between the soft magnetic phases is greater than or equal to 0.1 μm; and a composition of the Nd—Fe—B type rare earth magnet alloy is expressed by the following chemical formula (1)

$$Nd_xFe_{100-x-y-z}B_yV_z \qquad (1)$$

where x is within a range from 9 to 11, y is within a range from 5 to 8 and z is within a range from 0 to 2, wherein chemical formula (1) optionally comprises Co, and if Co is present in the alloy 0.01 to 30 atom % of Fe is replaced with Co.

8. The powder as claimed in claim 7, wherein the powder is heat treated within a range from 500 to 800° C.

9. A Nd—Fe—B type rare earth magnet alloy for producing a bulk of a Nd—Fe—B type anisotropic exchange spring magnet, comprising:
   hard magnetic phases and soft magnetic phases;
   wherein a minimum width of the soft magnetic phases is smaller than or equal to 1 μm; a minimum distance between the soft magnetic phases is greater than or equal to 0.1 μm; and a composition of the Nd—Fe—B type rare earth magnet alloy is expressed by the following chemical formula (1)

$$Nd_xFe_{100-x-y-z}B_yV_z \qquad (1)$$

where x is within a range from 9 to 11, y is within a range from 5 to 8 and z is within a range from 0 to 2, wherein chemical formula (1) optionally comprises Co, and if Co is present in the alloy 0.01 to 30 atom % of Fe is replaced with Co.

10. The powder as claimed in claim 7, wherein the powder is produced by pulverizing the Nd—Fe—B type rare earth magnet alloy into a size smaller than or equal to a size of the hard magnetic phase by means of a ball mill so as to exhibit an anisotropic property.

* * * * *